May 27, 1930.  K. E. PEILER  1,760,254
APPARATUS FOR FEEDING MOLTEN GLASS
Filed Dec. 31, 1923   15 Sheets-Sheet 1
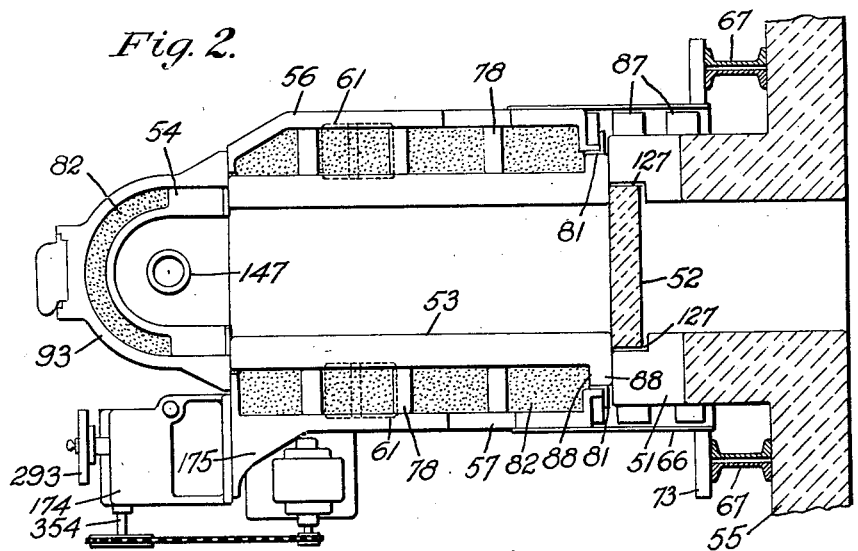
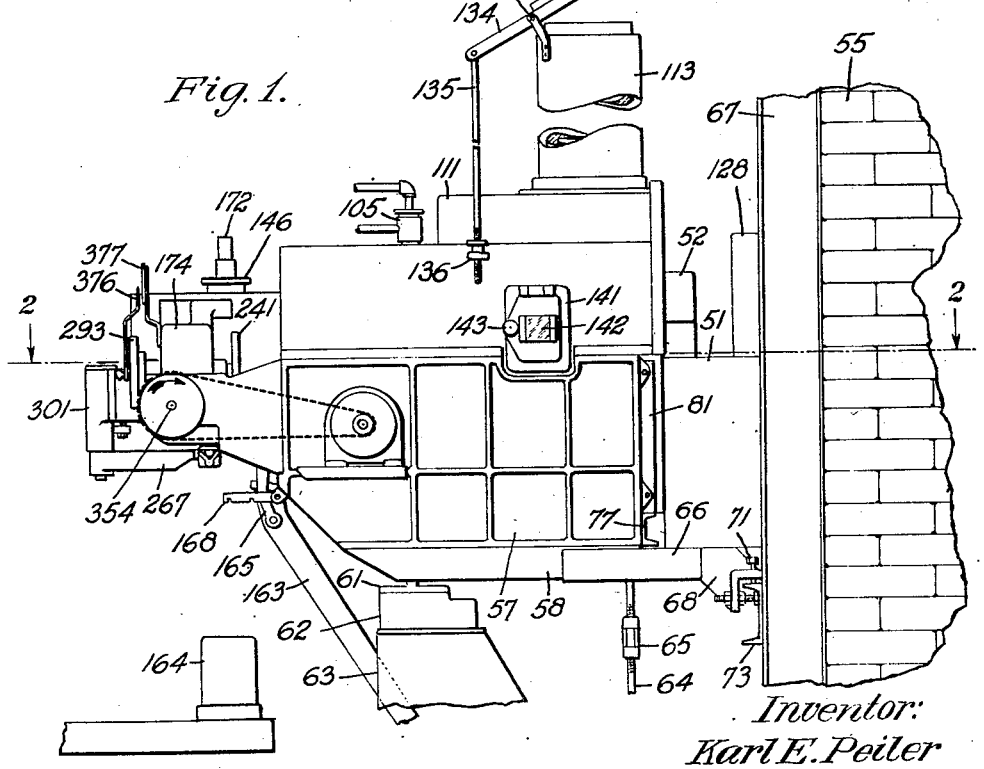
Inventor:
Karl E. Peiler
by W. H. Honiss
Atty.
Witness:
S. S. Grotta

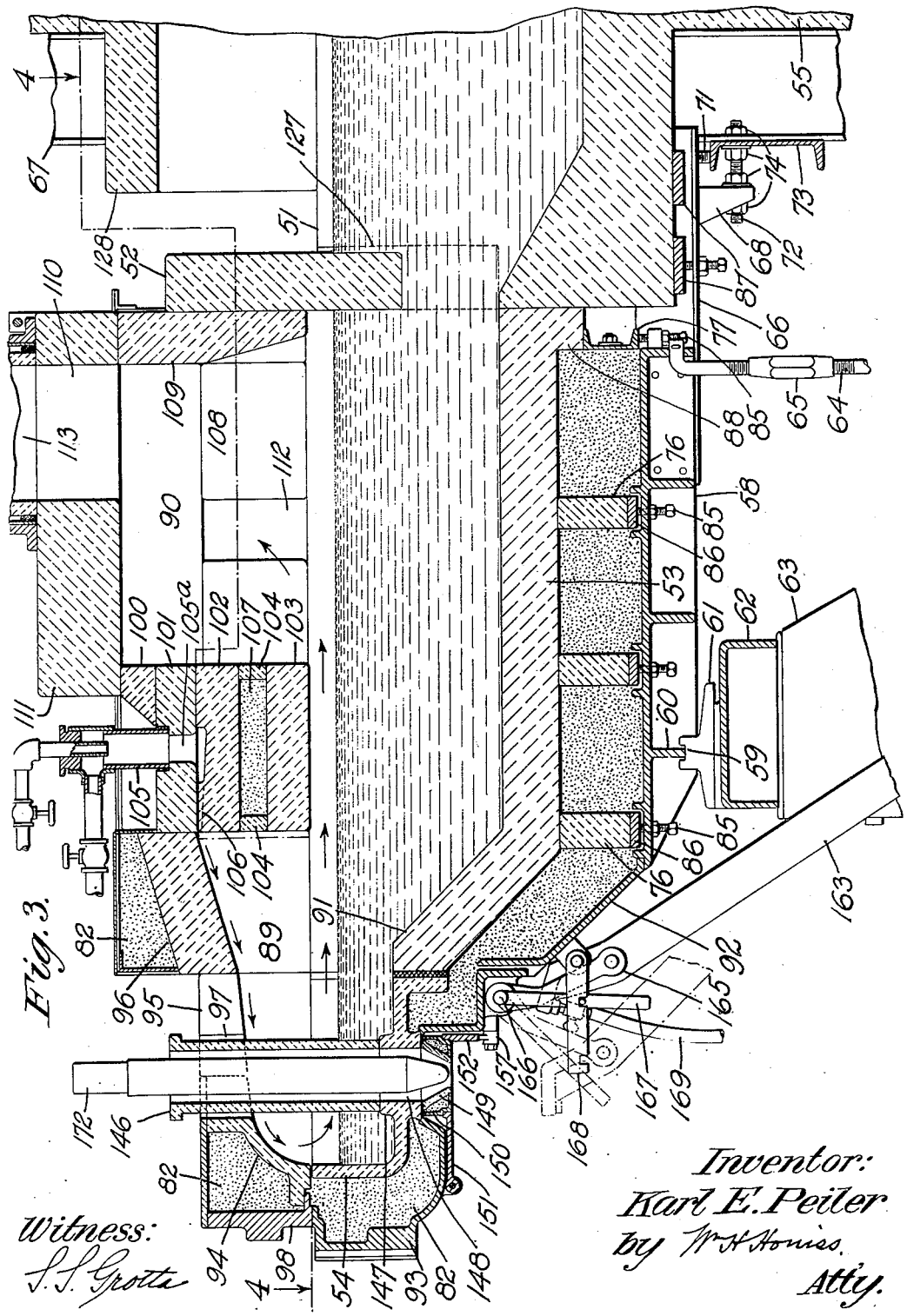

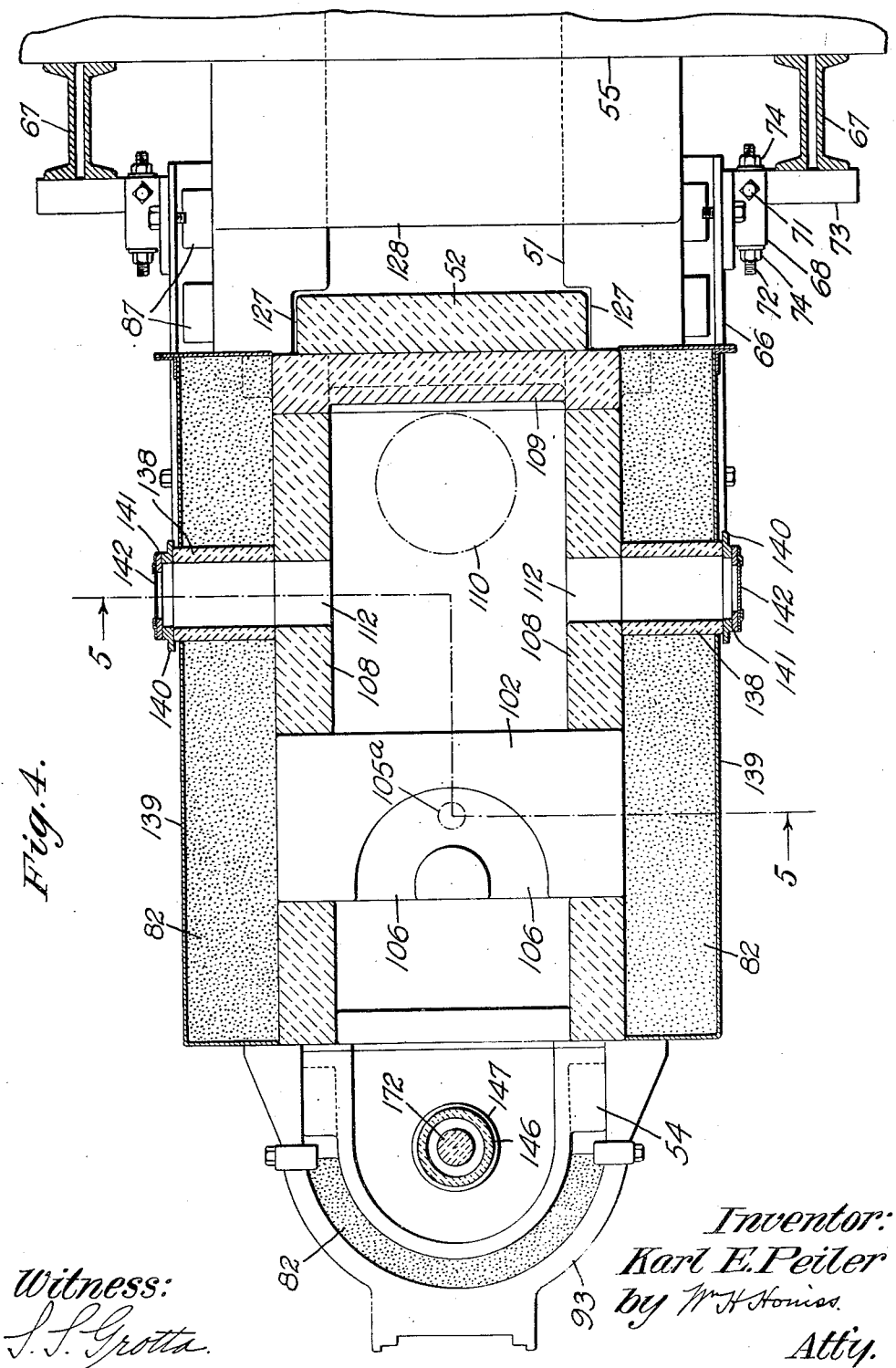

May 27, 1930.  K. E. PEILER  1,760,254
APPARATUS FOR FEEDING MOLTEN GLASS
Filed Dec. 31, 1923  15 Sheets-Sheet 4

Witness:
S. S. Grotta

Inventor:
Karl E. Peiler
by W. H. Honiss
Atty.

May 27, 1930.  K. E. PEILER  1,760,254
APPARATUS FOR FEEDING MOLTEN GLASS
Filed Dec. 31, 1923    15 Sheets-Sheet 5
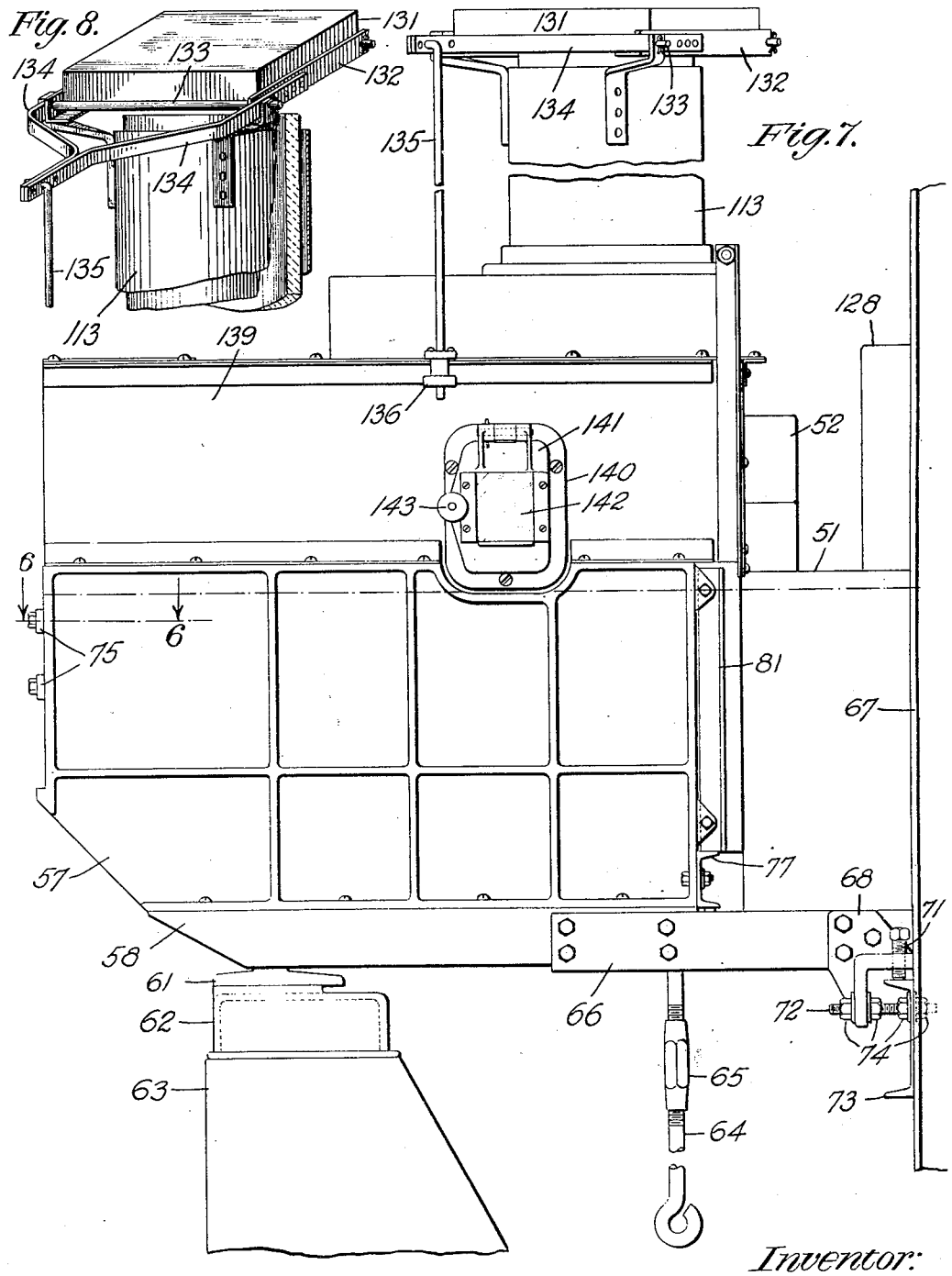
Witness:
J. S. Grotta
Inventor:
Karl E. Peiler
by W. H. Toniss
Atty.

May 27, 1930.  K. E. PEILER  1,760,254
APPARATUS FOR FEEDING MOLTEN GLASS
Filed Dec. 31, 1923    15 Sheets-Sheet 6
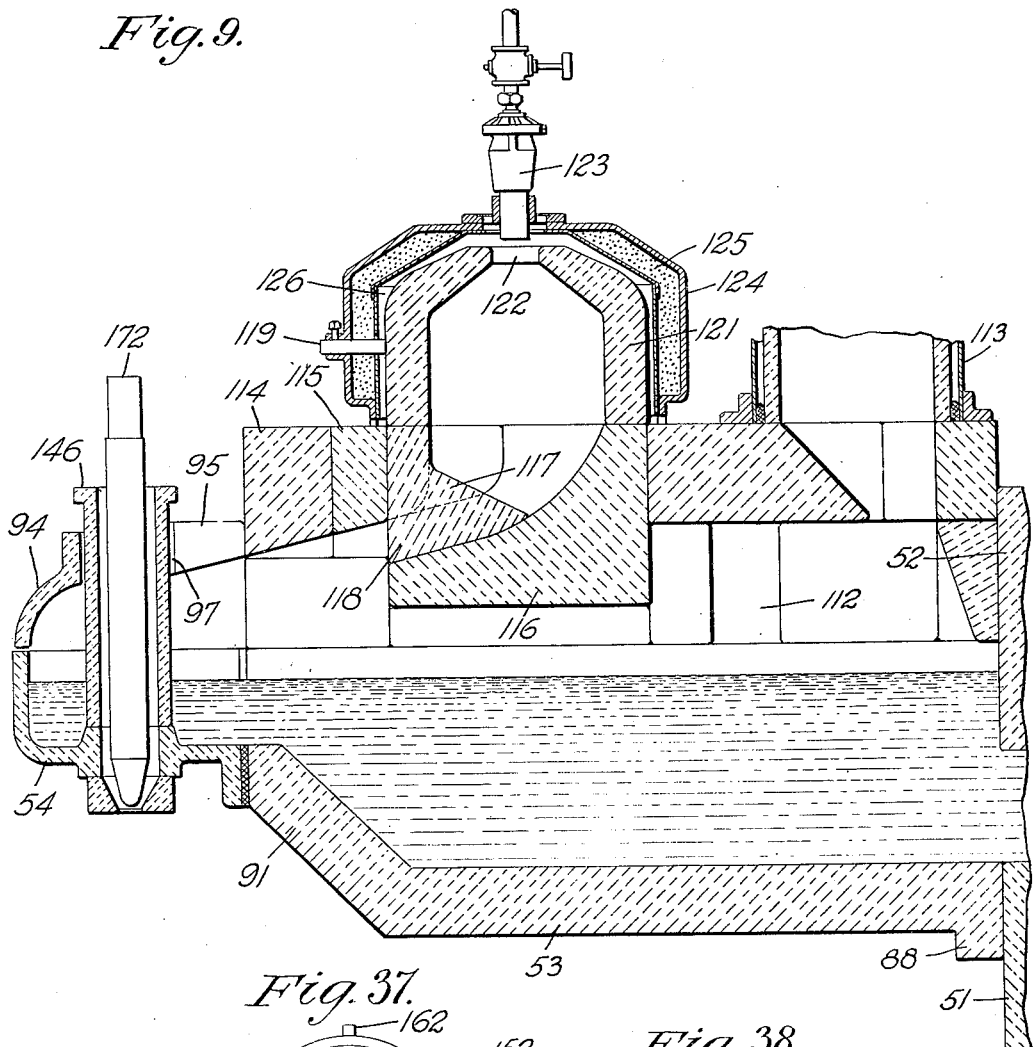
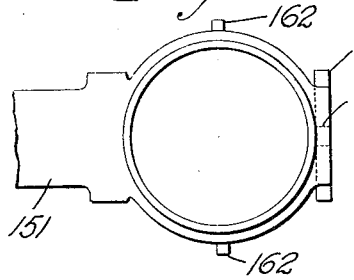
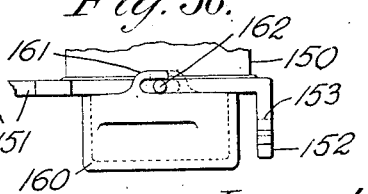
Witness:
J. S. Grotta
Inventor:
Karl E. Peiler
by W. F. Hoviss
Atty.

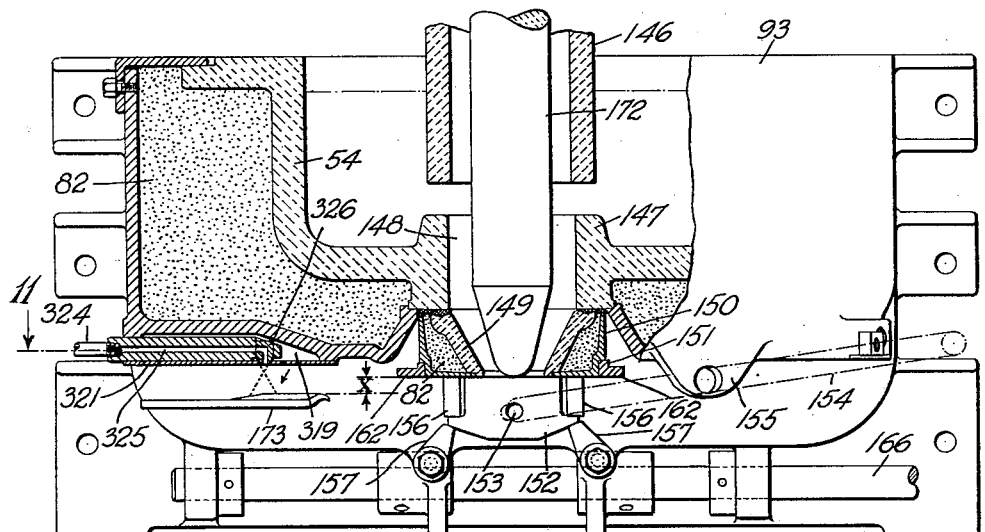
Fig. 10.
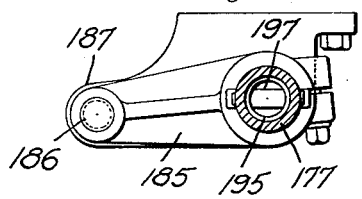
Fig. 13.
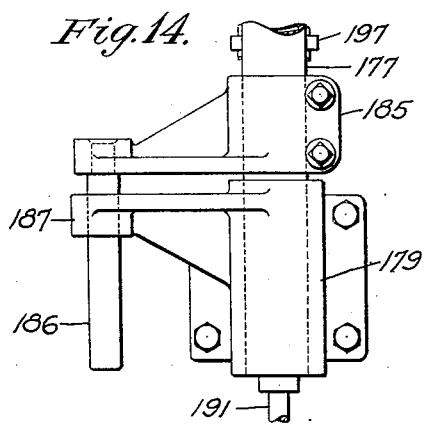
Fig. 14.
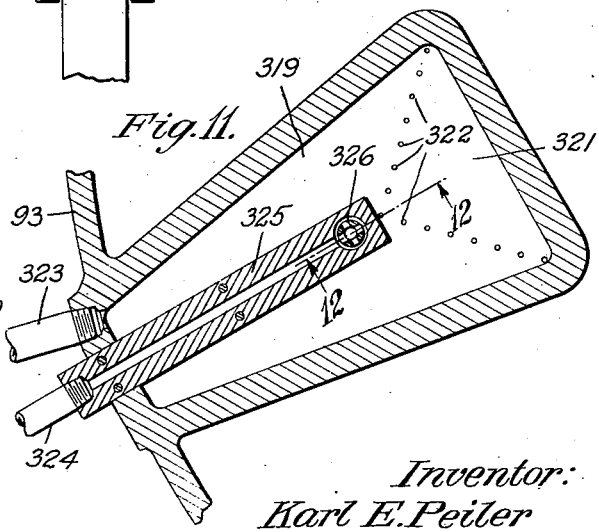
Fig. 12.
Fig. 11.
Inventor:
Karl E. Peiler May 27, 1930. K. E. PEILER 1,760,254
APPARATUS FOR FEEDING MOLTEN GLASS
Filed Dec. 31, 1923 15 Sheets-Sheet 8
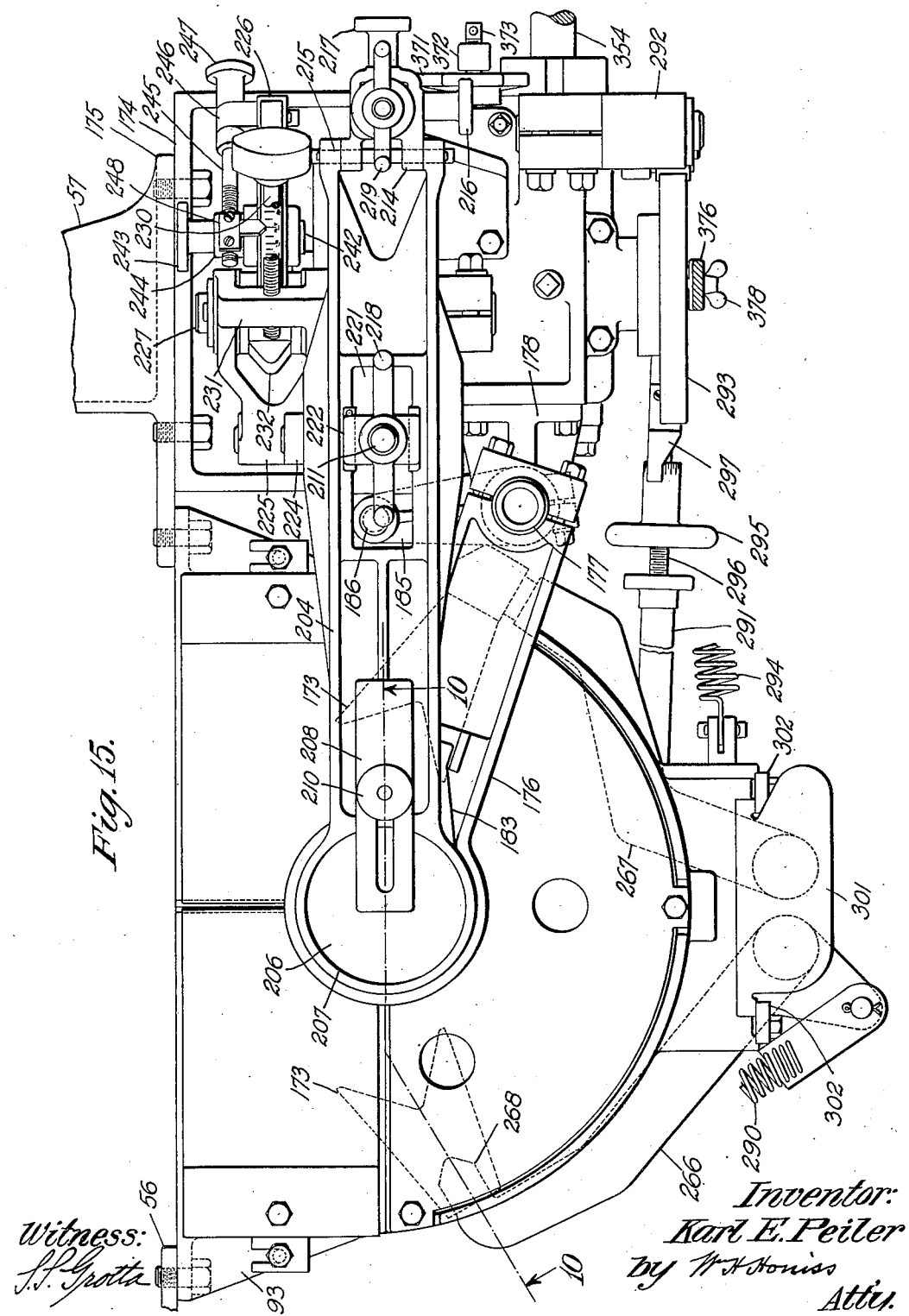

May 27, 1930.  K. E. PEILER  1,760,254
APPARATUS FOR FEEDING MOLTEN GLASS
Filed Dec. 31, 1923    15 Sheets-Sheet 9

Inventor:
Karl E. Peiler
by W. H. Honiss
Atty.

Witness:
S. S. Grotta

May 27, 1930. K. E. PEILER 1,760,254
APPARATUS FOR FEEDING MOLTEN GLASS
Filed Dec. 31, 1923 15 Sheets-Sheet 10

Witness:
S. S. Grotta

Inventor:
Karl E. Peiler
by W. H. Honiss
Atty.

May 27, 1930. K. E. PEILER 1,760,254
APPARATUS FOR FEEDING MOLTEN GLASS
Filed Dec. 31, 1923 15 Sheets-Sheet 11
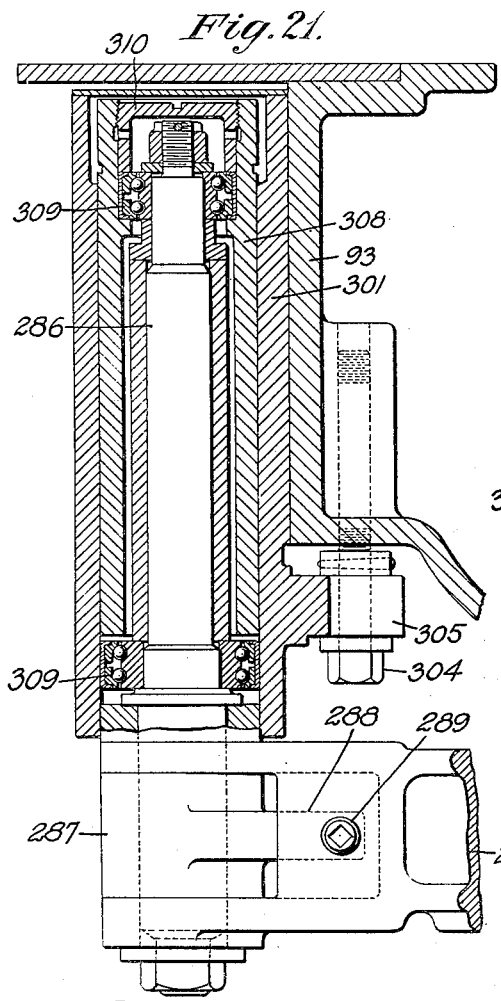
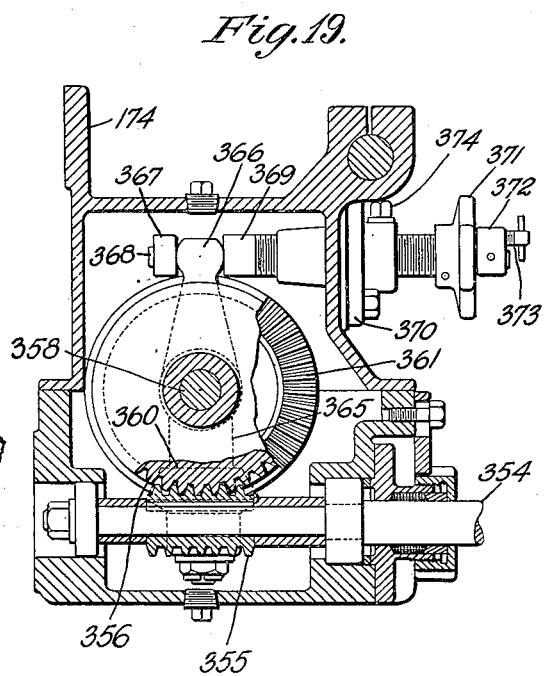
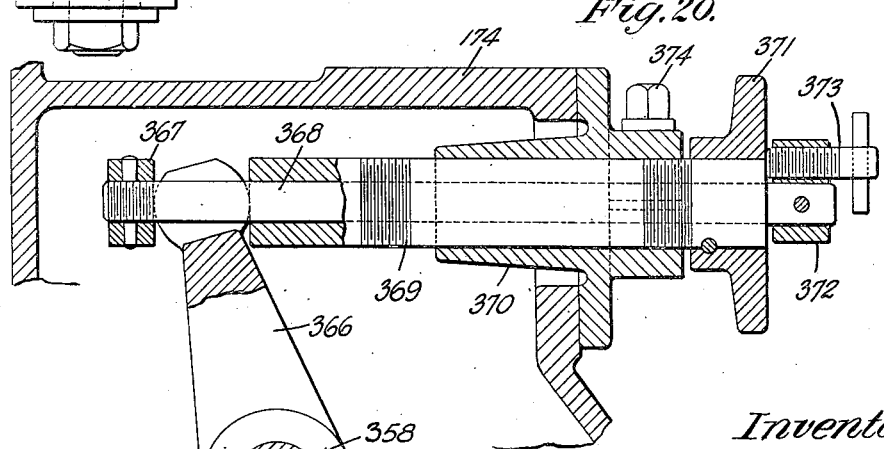
Inventor:
Karl E. Peiler

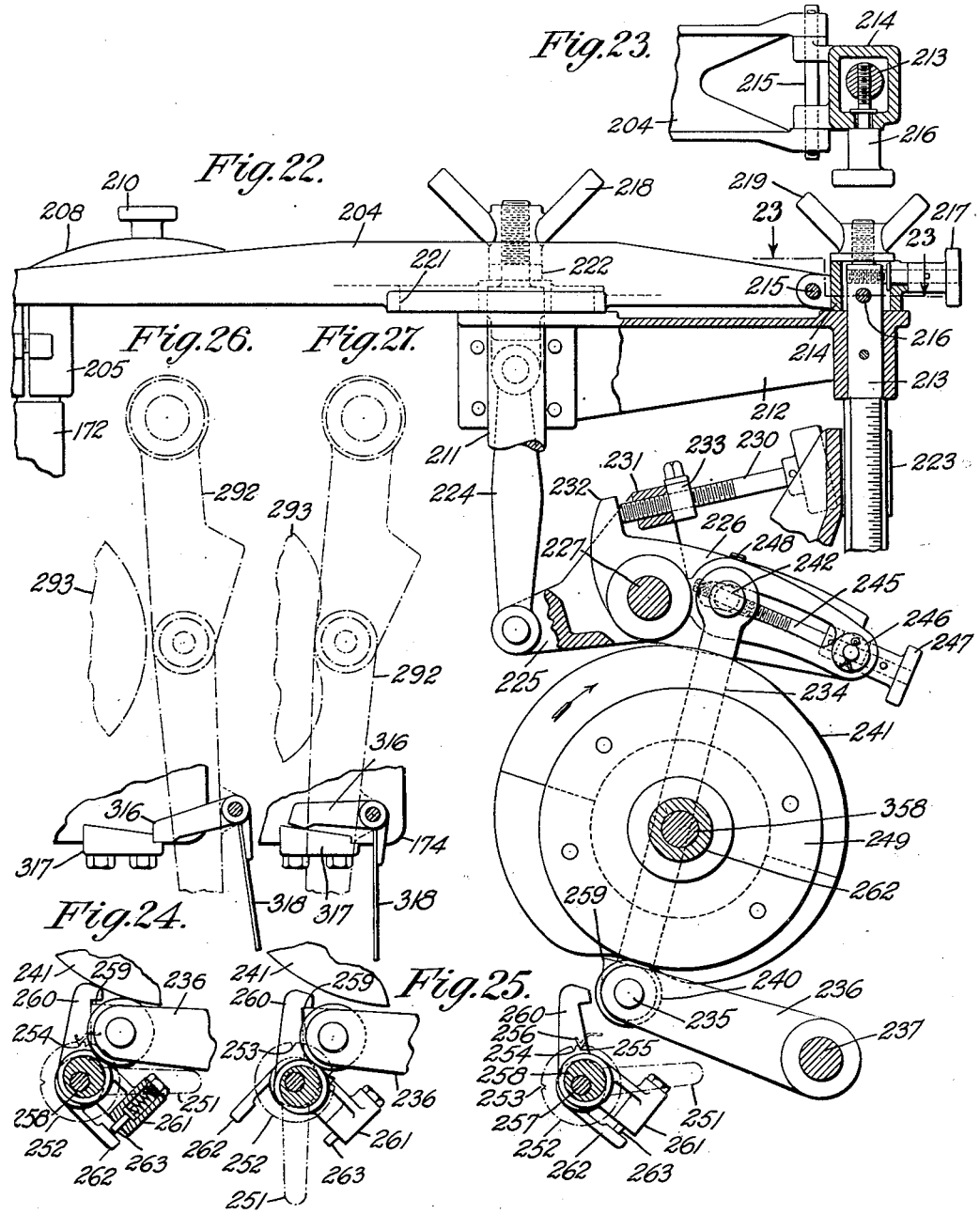

May 27, 1930.  K. E. PEILER  1,760,254
APPARATUS FOR FEEDING MOLTEN GLASS
Filed Dec. 31, 1923  15 Sheets-Sheet 13

Witness:
S. S. Grotta

Inventor:
Karl E. Peiler
by W. H. Honiss
Atty.

May 27, 1930.    K. E. PEILER    1,760,254
APPARATUS FOR FEEDING MOLTEN GLASS
Filed Dec. 31, 1923    15 Sheets-Sheet 14
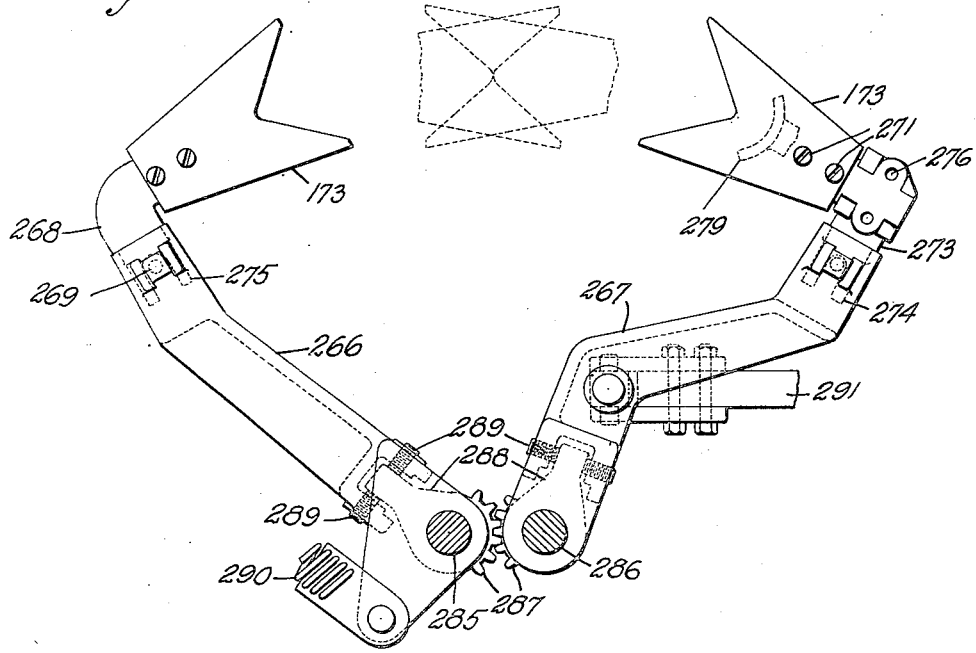
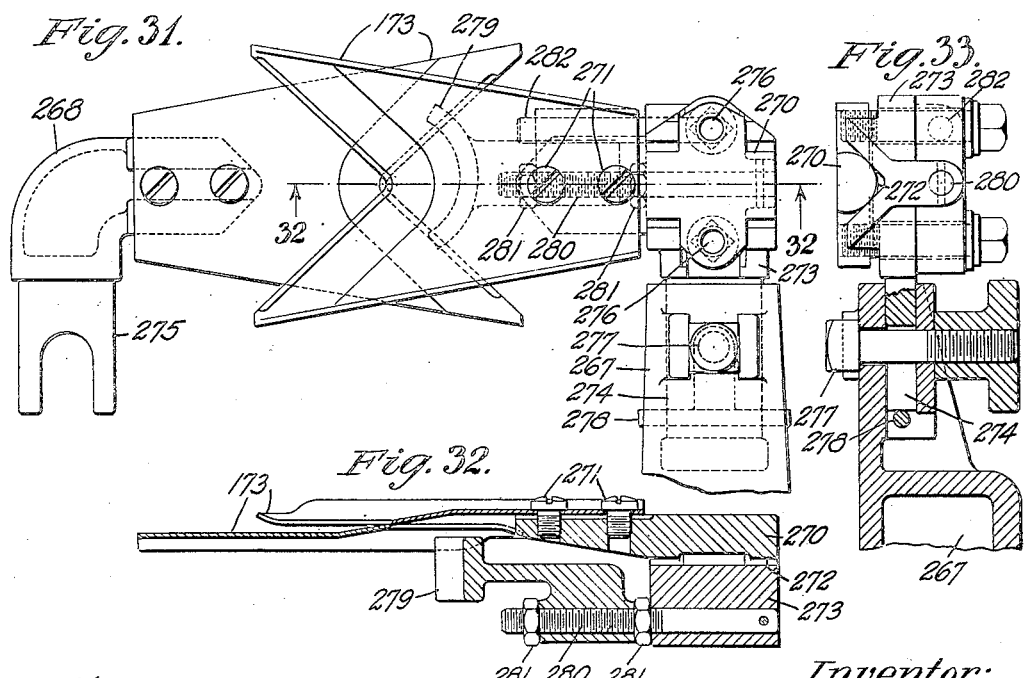
Witness:
S. S. Grotta
Inventor:
Karl E. Peiler
by W. H. Honiss
Atty.

May 27, 1930.  K. E. PEILER  1,760,254
APPARATUS FOR FEEDING MOLTEN GLASS
Filed Dec. 31, 1923  15 Sheets-Sheet 15

Witness:
S. S. Grotta

Inventor:
Karl E. Peiler
by W. H. Honiss
Atty.

Patented May 27, 1930

1,760,254

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FEEDING MOLTEN GLASS

Application filed December 31, 1923. Serial No. 683,576.

This invention relates to apparatus for feeding molten glass from a melting tank, furnace or other container, to the molds of a shaping machine.

The general object of the invention is to provide a new and improved apparatus for this purpose, which will supply and deliver molten glass in the best form and condition for use in the associated shaping machine. A more specific object is to provide such an apparatus having improved mechanisms for controlling the discharge of glass from an outlet, suspending it therefrom, and separating the suspended glass into mold charges of controlled size, shape, and condition suited for the molds to which they are delivered either directly or by means of a suitable chute or conveyor.

Among various features of the invention for the accomplishment of these objects and such other objects as will appear, are the following. A forehearth for conducting the glass from the melting furnace to the discharge outlet is provided with suitable means for controlling the temperature and condition of the glass discharged from the outlet, independently of the temperature and conditions in the melting furnace. This forehearth is also constructed and arranged so as to permit free and independent expansion and contraction of the glass furnace and of the forehearth parts, and to permit proper location and adjustment of the forehearth relative to the furnace. The forehearth is provided with improved heating means and is particultrly adapted to deliver glass at the discharge outlet in a homogeneous condition. Improved mechanism is provided for regulating the discharge of glass from the outlet in successive suspended masses. This mechanism is provided with adjustments and control devices which permit the certain and convenient adjustment of the parts, and control of the various functions while the machine is in operation, so as to provide the desired weight, shape and condition of mold charge without stopping the machine.

These and other features of the invention will best be understood from the following description, and from the accompanying drawings of a preferred embodiment of the invention, in which:—

Figure 1 is a side elevation of the apparatus, showing the forehearth, a part of the furnace, and a mold to which the charges are delivered, some details being omitted;

Fig. 2 is a plan view in section approximately on the line 2—2 of Fig. 1;

Fig. 3 is a side elevation of the apparatus, in larger scale and in section on the longitudinal center line through the forehearth and part of the glass melting tank, certain parts being omitted;

Fig. 4 is a plan view in section taken substantially on the line 4—4 of Fig. 3;

Fig. 7 is a side elevation of the forehearth; and

Fig. 8 is a detail view in side elevation showing the open position of the stack dampers;

Fig. 9 is a side sectional elevation, similar to Fig. 3 but showing a different construction for heating the forehearth;

Fig. 10 is a front elevation, partly in section on the line 10—10 of Fig. 15;

Fig. 11 is a plan view in section on the line 11 of Fig. 10, showing the shear spraying device in larger scale;

Fig. 12 is an elevation in section on the line 12—12 of Fig. 11;

Fig. 13 is a plan view in section on the line 13—13 of Fig. 16;

Fig. 14 is a front elevation projected from Fig. 13;

Fig. 15 is a plan view and Fig. 16 a front elevation of the operating mechanism, some of the parts being broken away or shown in section. In both these views the shear arms are shown in open position for greater clearness, their operating connections with their cam arm 292 being shown broken;

Fig. 19 is a front elevation in section approximately on the line 19—19 of Fig. 17;

Fig. 20 is a front elevation in section on the line 20—20 of Fig. 17;

Fig. 21 is a side elevation in section on the line 21—21 of Fig. 16;

Fig. 22 is a partial front elevation partly in section on the line 22—22 of Fig. 17;

Fig. 23 is a plan view in section on the line 23—23 of Fig. 22;

Figs. 24 and 25 are fragmentary views similar to Fig. 22, showing the device for securing the plunger in inoperative position;

Figs. 26 and 27 are detail views in front elevation, showing the device for holding the shears in inoperative position;

Fig. 30 is a plan view of the shear mechanism in section on the line 30—30 of Fig. 16;

Fig. 31 is a plan view, in larger scale, of the shear blades and their associated mechanism;

Fig. 32 is a front elevation of the shear blades, in section on the line 32—32 of Fig. 31;

Fig. 33 is a side elevation partly in section, of the parts shown in Fig. 31;

Fig. 34 is a plan view of the gauge for setting the shear blades;

Fig. 35 is a partial front elevation of the gauge;

Fig. 36 is a side elevation in section on the line 36—36 of Fig. 35;

Fig. 37 is a plan view of the end of the orifice ring carrier; and

Fig. 38 is a side elevation of the carrier showing the orifice closure in place.

Figure 5:
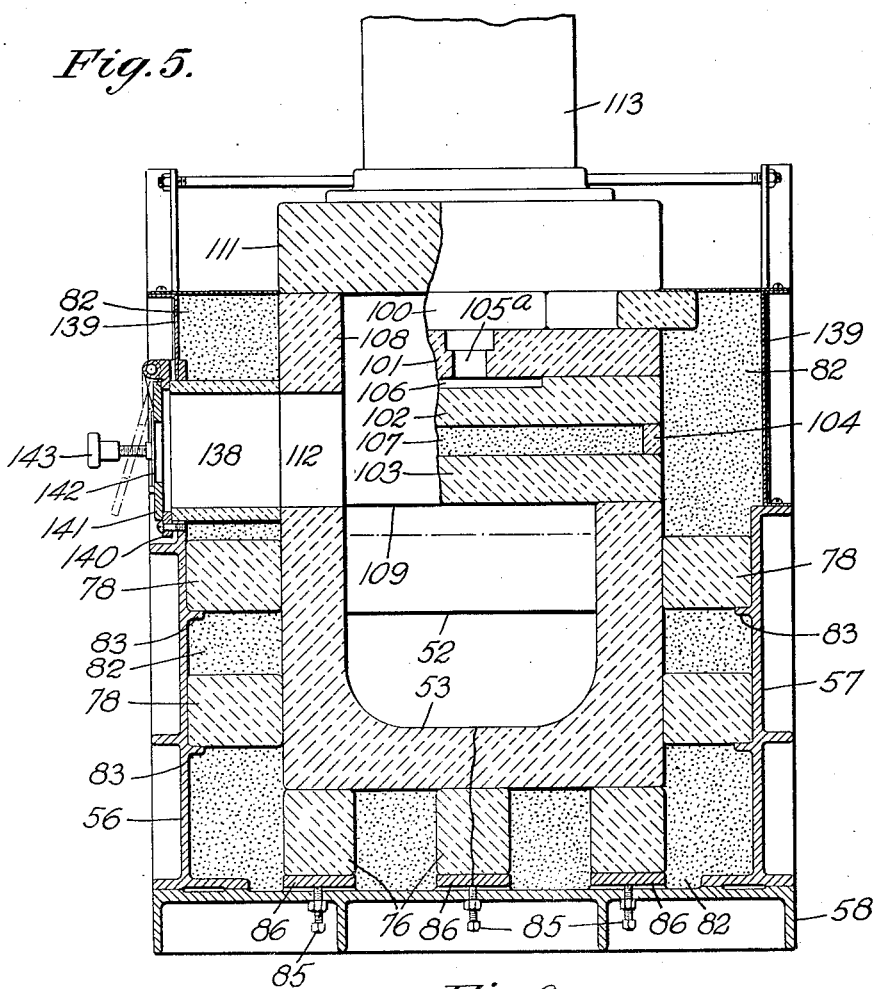
Fig. 5 is a front elevation in section substantially on the line 5—5 of Fig. 4.

This embodiment of my invention comprises a forehearth connected to a glass melting tank or furnace and provided with a discharge outlet, together with mechanism for discharging the glass periodically, accumulating each discharge at the outlet to form it into a mold charge, and severing the charge.

The forehearth may include an extension 51 of the furnace walls by which it is connected to the furnace, and preferably comprises a separator or sealing block 52, a channel or conduit 53, and a bowl or discharge chamber 54, provided with suitable covers, casings, supports and temperature control means. As shown in Fig. 3, the glass flows from the furnace 55 under the sealing block and into the forehearth by gravity.

Figure 6:
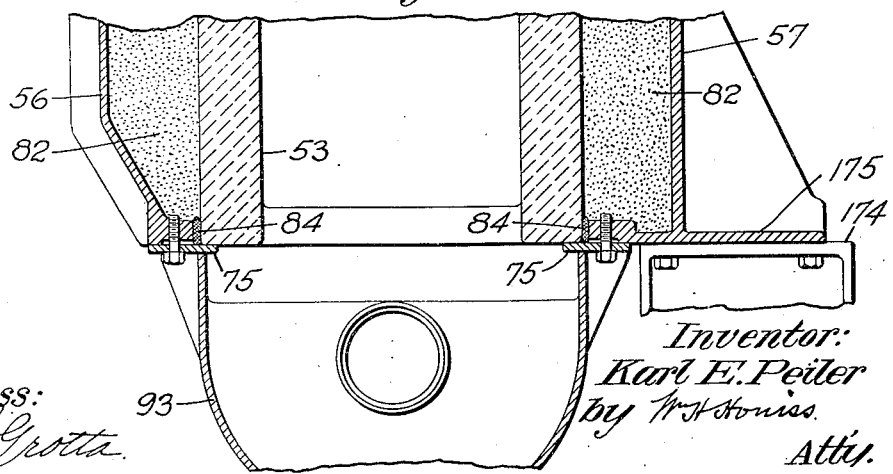
Fig. 6 is a plan view in section substantially on the line 6—6 of Fig. 7.

One of the features of this invention comprises means for suitably supporting the forehearth and its glass conducting channel, so that it may be properly connected and aligned with the glass furnace, and yet be free to move with the furnace to permit the contraction and expansion of each. For this purpose the forehearth is preferably carried by a casing, comprising side walls 56 and 57 (Figs. 1, 5 and 6) and a bottom plate 58, which also permits suitable insulation of the forehearth. The inner end of the bottom plate 58 is connected with the steel bracing of the furnace, and may be supported thereby. It is supported at its outer end by means such as a pair of iron shoes 61 (Figs. 1, 2 and 3) which are free to slide horizontally in any direction upon a cap 62 of the pier 63, as the furnace expands or contracts.

The supporting shoes 61 are also preferably arranged to permit the forehearth to be tilted longitudinally upon the shoes, to permit the adjustment of the inner end of the forehearth into conformity with the level of the adjacent end of the furnace, and to allow that inner end to follow changes of the furnace level caused either by expansion, contraction or settling of the furnace. The shoes 61 are preferably made with raised portions 59 which may be fixed or may be adjustable jack screws, supporting the outer end of the bottom plate 58 by one of its transverse ribs 60 (Fig. 3), these raised portions acting as a pivot upon which the forehearth may tilt longitudinally as its inner end is raised or lowered by the adjusting screws 71, or as it follows changes of the furnace level above referred to. By these means the forehearth may be adjusted to any desired level or position, and the furnace and forehearth are free to expand or contract or settle independently without straining them or displacing the forehearth from glass flowing connection with the furnace.

To prevent accidental longitudinal tilting of the forehearth during repair or construction work if it should become over-balanced by excess weight in front of the supporting shoes, holding-down means may be provided, such as tie rod 64 connected to a fixed anchorage beneath, and provided with a turn buckle 65 which may be adjusted to hold the forehearth in the desired position.

The rear end of the forehearth is held firmly against the furnace walls without exerting undue pressure thereon and may move with these walls when they are moved by expansion or contraction or settling of the furnace. To provide vertical and horizontal adjustment of the rear end of the forehearth to hold and align it relatively to the furnace, rear supports are provided, comprising angle irons 66 (Figs. 1 to 4, and 7) extending from the bottom plate 58 toward wall braces 67 of the furnace 55, each extension carrying a bracket 68 with a supporting screw 71 and a tie rod 72 (Figs. 3, 4 and 7). The supporting screws 71 rest on a bearing bar 73 which is bolted to the adjacent furnace iron work, such as the wall braces 67. The tie rods 72 pass loosely through holes in the brackets 68 and the bearing bar 73, and are adjusted by nuts 74 on either side of these members; whereby the forehearth may be moved toward or from the furnace, and into even contact therewith. When the nuts 74 are adjusted, the tie rods act to swing the forehearth in any horizontal direction. By means of the screws 71, the rear end of the forehearth may be adjusted vertically. In this way the forehearth may be connected to and held back against the furnace in the desired position and alignment without undue thrust on the abutting blocks of the furnace walls. As the furnace walls move under the influence of heat, the furnace iron work or wall braces 67 and the forehearth move with them as a unit without exerting undue stress which would crack or distort the walls.

Adjustable bars 75 (Figs. 6 and 16) carried by the forehearth casing 56 and 57 bear against the front end of the channel 53 to hold it firmly against the extension 51. These straps also provide for inequalities in the lengths of the channel and casing structure.

To provide spaces for suitable heat insulation of the channel 53, it is carried on a series of refractory support blocks 76 and a bearing bar 77 (Figs. 3 and 5) and braced or held securely in position sideways by a series of refractory brace blocks 78 and angle irons 81 (Figs. 2 and 7). This holds the channel in the desired position and yet provides a space between the channel and the metal casing to hold heat insulating material 82, such as kieselguhr.

The brace blocks 78 fit between the channel 53 and the casing 56 and 57, being supported in horizontal position by the ledges 83, (Fig. 5) and they may be luted tightly in place with plastic clay or held with set screws, so as to bear firmly against the channel walls and brace them against the pressure of the molten glass. The channel may also be braced at its outer end by fire clay packing 84 (Fig. 6) packed between the channel and the side walls 56 and 57 of the casing.

The support blocks 76 and the bearing bar 77 are preferably adjustable in height as by screws 85 (Figs. 3 and 5) threaded into or carried by the bottom plate 58, each block 76 having a metal plate 86 interposed between it and its adjusting screw. This construction enables the supports to be adapted to structural variations, such as inequalities in the channel 53, and enables the weight of the channel and the parts carried thereby, to be equally distributed on the various supports, thereby minimizing the danger of cracking. It also allows the channel 53 to be adjusted to the desired level independently of the forehearth casing, which is particularly convenient during erection of the apparatus.

The extending portion 51 of the furnace may be supported by cross bars 87 (Figs. 3 and 4) carried by the angle irons 66 and independently adjustable for height by screws, or it may be supported in any convenient manner by the furnace structure.

The channel 53 may be made in one piece of suitable refractory material and is preferably provided with an outwardly turned flange 88 (Figs. 2 and 3) at its back end, which fits against the extension 51 of the furnace and forms a joint of sufficient depth to prevent leakage of glass. The extension of the outer edges of the flange beyond the insulation allows the outer portion of the joint to be exposed to the air, thus chilling the glass in the joint sufficiently to prevent leakage.

The channel is preferably made deep enough throughout the greater portion of its length to hold a body of glass of large cross section, so that it may flow slowly. The front end of the floor of the channel is inclined upwardly at 91 (Fig. 3) to provide a gradual reduction of the depth of glass near the discharge bowl. This inclined portion 91 is also protected by insulating material which is retained in place by a metal apron 92, forming part of the enclosing casing of the forehearth.

At the outer end of the channel 53 and forming a shallower extension thereof is the discharge bowl 54 formed of suitable refractory material. It is held by the metal casing 93 which is attached to the walls 56 and 57 of the main casing of the forehearth and which is made larger than the bowl to hold insulating material 82 between them, (Figs. 3 and 4). The glass flows from the furnace through the channel 53 and into the discharge bowl, whence it discharges through a well and outlet under the control of regulating devices to be described later.

The forehearth is adapted to serve as a means for conditioning or re-conditioning the glass as it flows through the forehearth from the furnace to the forehearth outlet, and is provided with suitable heating means and draft control means, which are operated and controlled independently of the varying conditions of draft, heat and homogeneity existing in the melting furnace, so as to deliver the glass at the forehearth outlet uniformly in a homogeneous condition and at the temperature desired for feeding the glass in mold charges of the desired weight and shape. The desired conditions are difficult, if not impossible to obtain or to control in the melting furnace itself, because of the great mass of glass therein and the difficulty of heating that mass uniformly to the temperature desired for feeding the glass in compact charges of the desired weight, shape, temperature and uniformity. For this purpose the forehearth is provided with a firing or combustion space which is sealed off above the glass level from the firing or combustion space in the melting furnace, and is heated by suitable burners, from which flames are projected into the forward or delivering end of the forehearth and are then directed backwardly over the surface of the glass in the forehearth, the products of combustion passing out through a draft stack located over the rearward end of the forehearth. For convenience in thus controlling and directing the heat, the firing space is preferably divided into two chambers (Fig. 3), a front chamber 89 at the discharge end, and a rear chamber 90 toward the furnace end of the forehearth, these chambers being partly separated by a baffle formed by the blocks 102, 103, 104, extending downwardly toward the surface of the glass, so as to deflect the flames or heated currents close to the surface of the glass as they pass backwardly under the baffle. The forehearth walls enclosing the fire space and glass are made of refractory material and are as far as possible provided on their outer sides with heat insulating material, enclosed and retained by suitable metallic casings.

The front chamber 89 is enclosed by an arched front cover 94, (Figs. 3 and 16 ) a pair of mating side covers 95 each forming a half arch, and a sloping cover block 96 resting on side walls. The front cover 94 and the side covers 95 are cut away as shown, (Figs. 3 and 16) to form a circular opening 97 through which the discharge controlling members 146 and 172 operate, and are readily removable without disturbing these members.

Behind the front chamber 89 is a baffle formed of refractory blocks 100, 101, 102, 103 and 104 (Figs. 3 and 5) bridged across from the side walls of the channel 53. The upper block 101 is provided with an opening 105ª into which a suitable burner 105 (Fig. 3) discharges a controllable mixture of gas and air into a port 106 formed in the block 102. This port is preferably horse shoe shaped as shown in Fig. 4, whereby the burning mixture is discharged into the forehearth in a divided stream. To prevent the fuel mixture from igniting prematurely in the port 106, the port block 102 is kept relatively cool by heat insulation 107 supported by the block 103 and retained in place by the refractory blocks 104.

The rear chamber 90 back of the baffle is enclosed by side walls 108 and a rear wall 109 carrying a cover block 111. A sealing block 52 extending into the glass seals the chambers 89 and 90 from the fire spaces above the glass level in the furnace. Each side wall 108 is provided with a port 112 for admitting cooling air to aid in conditioning the glass when desired, and the cover block 111 is provided with an opening 110 leading to a suitable exhaust stack 113.

A modified arrangement, more particularly of the burner and to some extent also of the burner and fire spaces, is shown in Fig. 9. Here the fuel space is extended above the forehearth, the extension with its insulating means being more readily removable and renewable. Above the forehearth and forming an extension of the combustion or mixing chamber in the forehearth is an inverted refractory bowl 121, provided with a burner opening 122 into which any suitable form of gas or oil burner may discharge. For purposes of this illustration, an adjustable gas burner 123 of the induction type is shown. The inverted bowl 121 is surrounded by metallic casing 124, provided with heat insulation 125, and enclosing an annular air space 126 between the casing and the bowl. Air drawn into the annular air space 126 by inductive action of the burner enters all around the open lower edge of the casing 126, is preheated by its passage over the heated bowl 121, and is then injected through the opening 122 into the bowl chamber. The casing 124 is centered with the bowl 121 by means of adjustable pins or screws 119 disposed around the side wall of the casing and bearing against the bowl, so as to equalize the width of the annular space and distribute the consequent inflow of air equally on all sides. This results in conservation of the heat, which instead of being lost by radiation to the surrounding air is confined by the insulated casing 124 and is moreover taken up by the entering air and returned to the inside of the bowl, the heated air also improving the combustion conditions.

From the bowl 121 the space extends through ports 118 formed in the burner block 116 and in a dividing block 117, which divides the passage for the burning gases into ports of the desired number and having the desired size and distribution, as in Fig. 3. The blocks 116 and 117 in this case form a baffle similar in effect to that shown in Fig. 3, dividing the firing space into two chambers. In the construction shown in Fig. 9, the cover in front of the baffle is made in separate pieces 114 and 115, one or both of which may be removed to allow of inserting a gate to stop the flow of glass from the forehearth while the discharge bowl is being replaced. This, however, is a feature which may also be applied to the construction shown in Fig. 3 by suitable design.

In both of the constructions shown the temperature conditions in the forehearth may be controlled independently of the temperature conditions in the melting furnace, to properly condition or re-condition the glass. The spaces in the forehearth and in the melting tank above the glass line are separated from each other to prevent the flow of air and gases between the furnace and the forehearth above the glass line, so that the fire spaces in the forehearth are not affected by the draft or temperature conditions in the furnace, thus permitting independent control of the heating conditions in the forehearth.

The rear wall 109 (Fig. 3) of the forehearth serves as a partial separating member, which may be supplemented by a separator or sealing block 52 extending below the glass level (Fig. 3). This block bridges across the furnace extension 51 and fits into recesses 127 (Fig. 2) formed in the side walls of this extension, fitting against the rear end of the channel 53 and the rear wall 109 of the forehearth. To further complete the seal, the joint between the rear wall and the sealing block may be sealed by a fire clay luting. The depth to which the separator block 52 is immersed in the glass may be varied as desired to draw glass from the furnace into the forehearth from a higher or lower stratum. Since the temperature of the glass in the furnace is hottest at the top and is progressively cooler toward the bottom, the depth to which the separator 52 is set permits hotter or colder glass to be drawn from the furnace as desired.

The extension 51 from the furnace may be partly or fully covered by covers 128, some of which may be removable, to facilitate replacing or adjusting the separator 52. It may at times also be desirable to remove a section or sections of the cover 128 in order to cool the glass flowing from the melting furnace into the body of the forehearth.

The stack 113 connected with the opening 110 in the cover block 111, may consist of a metallic casing lined with suitable refractory material. At the upper end of the stack is a refractory damper 131 (Figs. 1, 7 and 8) carried in a frame formed by angle irons 132 pivotally mounted on a rod 133, so that the damper may be tilted by bars 134 connected with an operating rod 135. The lower end of the rod passes through a fixed bracket on the forehearth casing and is threaded for a hand nut 136, which is held against the bracket by the weight of the damper. By turning this hand nut 136, the damper may be adjusted to control the amount of draft applied to the fire spaces in the forehearth by the stack.

In order to secure a better control of the draft conditions in the forehearth, the metallic casing enclosing the forehearth and the structure of the refractory parts and their braces is adapted to form a tight closure. Such parts as the sealing block 52 and certain of the cover blocks are arranged to make close joints and adapted to be luted with fire clay. The opening 97 fits the discharge control means closely, so that uncontrolled leakage between the fire space and the outside air is reduced to a minimum.

The air ports 112 for admitting cooling air to the rear fire space when desired are also provided with close fitting closures to minimize leakage. Refractory thimbles 138 (Figs. 4, 5 and 7) abut against the refractory side walls 108 in register with the port openings 112 therein and extend through the insulation 82 and the side of the upper forehearth casing 139. A collar 140 carried by the casing fits closely against the end of the refractory thimble and holds it in place against the side wall. The joint between the collar and the thimble and between the thimble and the side wall is preferably tight. The collar 140 carries a swinging door 141 pivoted thereon and carrying a transparent window 142 made of mica or heat resisting glass. The door is adapted to fit closely against its supporting collar 140 when closed, and may be opened to any desired extent by screw 143 threaded into the door and bearing against the collar. By thus adjusting the door opening, the desired amount of cooling air may be admitted into the forehearth or it may be positively shut off. The transparent window has the great advantage of permitting a view of the interior of the fire space, as for inspecting the fire conditions, without such interference therewith as would be caused by opening the door for such inspection. If the door were opened for this purpose, the increased amount of air admitted would so alter the draft and firing conditions as to give an incorrect indication of the conditions existing when the door is properly adjusted.

By means of the combination of the heating burner, controllable stack draft, controllable admission of cooling air, and the general arrangement for firing, the glass delivered by the forehearth may be properly conditioned and kept uniformly at the desired temperature in spite of variations of temperature occurring in the glass furnace. The burner projects a divided flame forward toward the discharge end of the forehearth, so that the flame impinges against and flows along the cover blocks, then turns downwardly and flows back along the surface of the glass toward the rear of the forehearth under the baffle plate 103, as indicated by the arrows in Fig. 3. The burner may be regulated by suitable valves to control the amount of fuel and air admitted. Depending on the setting of the burner and the draft conditions, the flame or heat therefrom will be projected toward the front end of the forehearth a determinable distance, either deflecting downwardly against the front cover 94 and around the tube 146, or turning downwardly to assume its backward course at a point nearer the burner ports 106. Some of the flame may turn downwardly closer to the burner nozzle, and other portions may be projected further forward, so that a "horseshoe" flame is produced, which gives an extremely even heating effect in the front end of the forehearth. This tends to bring the glass around the flow outlet to an even temperature and helps to produce a homogeneous mold charge. As the flame travels backwardly under the baffle, and spreads throughout the greater space 90 back of the baffle, its temperature falls progressively, so that the glass is subjected to a gradually increasing heat effect, as it progresses from the rear to the front of the forehearth. This is advantageous, as will be explained later.

The temperature of the rear fire space 90, which is naturally lower than that of the front fire space 89, may be further controlled by the regulated admission of cooling air through the ports 112. This air cools the hot or burning gases coming from the front fire space, and escapes up the stack with them. The amount of cooling air admitted depends not only on the adjustment of the air port doors, but also on the setting of the stack damper, which controls the draft inducing the supply of cold air.

The adjustments of the stack damper 131 also influences the course and position of the flame from the heating burner. With any given burner adjustment, an increase of draft by raising the stack damper causes the flame to turn downward and backward nearer to the baffle and tends to increase the temperature of the rear fire space 90. Conversely, a decrease of draft by lowering the stack damper throws the burner flame further forward and tends to lower the temperature of the rear fire space 90. If, for any setting of the stack damper, the burner be adjusted to deliver more fire or for more fuel relatively to the air supply, the flame will be thrown further forward, and if it be turned down to deliver less fire or to burn less fuel in proportion to the air, the flame will not be thrown so far forward, but will turn down and move backwardly under the baffle sooner than it would if more fuel is supplied. The effect of the stack draft on the flame in the front fire space 89 is varied by the degree of opening of the cooling air ports. If, with any given setting of stack damper, the cooling ports are opened wider, the burner flame will be thrown further forward. In other words, the effect of the stack draft in pulling the fire further back or letting it go further forward depends on the amount of air which is admitted by the cooling air ports to satisfy this draft, and on the amount of fuel projected by the burner to satisfy the draft.

The character of the flame delivered by the burner is important. The flame should not be too short or quick burning as this produces only a local heat with resultant uneven temperature in the glass. There should, however, always be enough air for complete combustion and to prevent a smoky flame, which is not so easily controlled and tends to deposit carbon in the glass. The character of the flame may be varied within limits so as to produce a longer or shorter flame. It is preferable to adjust the burner to produce a clear flame which is neither smoky nor short and quick burning, and which allows a maximum of control by the stack damper and produces an even heating effect, especially in the front fire space 89 of the forehearth, when the glass is nearing the completion of its progressive conditioning treatment. Such a flame may easily be drawn back or allowed to burn further forward in the forehearth by respectively raising or lowering the stack damper.

By adjusting these various factors, the temperature of the glass being delivered may be raised or lowered from the temperature of the glass in the furnace. This may be done within a certain range by adjustment of the burner alone. If, however, the glass in the furnace is too hot as it flows into the forehearth, it may be cooled by admission of cooling air through the cooling ports. In doing this, it is preferable to cool the surface of the glass slightly below the temperature at which it is desired to deliver it, so that then when the glass is subjected to the action of the flame in the front fire space, it will attain the desired temperature and be uniform throughout. If the glass from the furnace is too cold, the burner may be adjusted to supply more heat and the flame may, if necessary, be drawn well back into the rear fire space 90 so as to extend its heating effect over the entire length of the forehearth.

The glass flowing from the furnace and through the forehearth tends to be hotter on top and progressively colder toward the bottom. It also tends to be colder at the sides of the forehearth than at the center line. This is because of the temperature variation between upper and lower layers in the furnace and because of the cooling influence of the bottom and side walls of the forehearth. The insulation 82 helps to minimize this influence and so to minimize cold streaks in the glass. The double fire space with the even heat in front also helps to equalize the temperature of the glass in the relatively shallow layer flowing from the front of the channel into the discharge bowl 54 and permits the delivery of homogeneous mold charges therefrom.

The glass discharging from the bowl 54 passes between the bottom of a tube 146 and the top of a curb 147 (see Fig. 10) surrounding and forming a part of a well 148 in the bottom of the bowl. Means are provided for adjusting the tube vertically to regulate the quantity of glass discharged, or to seat the tube on the top of the curb, as shown in Fig. 3, close enough to stop the discharge of glass, as will be described later.

The glass is discharged from the well 148 through an outlet ring 149 (Fig. 10) surrounded by insulating material 82 enclosed in a metal casing 150 by which the ring is supported. The lower edge of the ring is provided with a reduced shouldered portion which is received and positioned by the casing. The casing is similarly positioned and supported beneath the well 148 by a carrier 151 (Figs. 3, 10, 37 and 38) pivotally mounted on the bowl casing 93.

The outlet rings are changed occasionally in the use of the apparatus, to replace rings which have become worn, or to change the size or the orifice in accordance with the ware being made. The connection between the upper surface of the outlet ring and the bottom of the well 148 is made glass tight by the use of a suitable packing, such as clay, which is applied in plastic condition. These rings are often replaced while the apparatus is hot, and, therefore, it is necessary that the new ring shall be quickly and accurately positioned as the clay packing sets quickly under the action of heat. Therefore, provision is made for forcing the outlet ring up into position quickly and forcibly. For this purpose, the carrier 151 is provided with a depending ledge 152 (Figs. 10 and 38) having a hole 153 to receive the reduced end of a bar 154 shown in broken lines in Fig. 10 extending through an apertured lug 155 of the bowl casing 93, which forms a fulcrum for the bar. By this construction the outlet ring, which is definitely positioned in its case 150, may be placed in the opening of the carrier 151 while the carrier is swung down, and then the carrier may be swung quickly and forcibly up into exact position beneath the well by the use of the bar 154. Stops 156 are provided to limit the upward movement of the carrier, and latches 157 are arranged to be turned into position in engagement with the bottom of the carrier ledge 152 to hold it rigidly in position.

When the operation of the feeder is temporarily discontinued, it is desirable that the well 148 and the outlet ring 149 shall not be permitted to cool sufficiently to freeze the glass therein and prevent its flow when the operation of the machine is again commenced. For this purpose, a closure containing heat insulating material as shown in U. S. Patent No. 1,421,810 to Vergil Mulholland, but having improved means for positioning it beneath the orifice may be used. This preferably comprises a metal cup 160 (Fig. 38) containing suitable heat insulating material, preferably loose kieselguhr, and provided with ears 161 which engage lugs 162 (Figs. 10 and 37) projecting from opposite sides of the carrier 151. The ears and the lugs form a bayonet joint, so that the cup may be quickly positioned beneath the orifice and turned slightly to secure it in position.

Means are provided for diverting the discharged glass to a cullet receptacle when the glass is not suitable for use or is not to be delivered to the molds 164 (Fig. 1) of the associated shaping machine. For this purpose, a chute 163 (Figs. 1, 3 and 10) is supported below the orifice in such a manner that it may be moved into and out of position to intercept the discharging glass. The chute is carried by links 165 rigidly connected with a rod 166 pivotally mounted on the bottom of the bowl casing 93, and provided with a handle 167 (Fig. 3) by which the chute may be moved to and from the two positions indicated. The chute is secured in either of these positions by a latch 168 having two notches which engage a pin on the handle 167 and hold it in one or the other of the positions shown in Fig. 3 until the latch is lifted. A flexible pipe 169 is connected with the chute to supply water to its glass conducting surface when it is in use.

The formation of the mold charges is controlled and regulated by the tube 146, a reciprocating plunger 172 projecting through the tube and the shear blades 173. An important feature of this invention is the operating mechanism for these implements which control the formation and suspension of the mold charges, including the various adjustments of which this mechanism is capable. The mechanism for operating and adjusting these parts is supported on the front of the forehearth, in or on a box 174 (Figs. 1, 2, 15 and 16) secured to a bracket 175 formed on side wall 57 of the forehearth.

Figure 16:
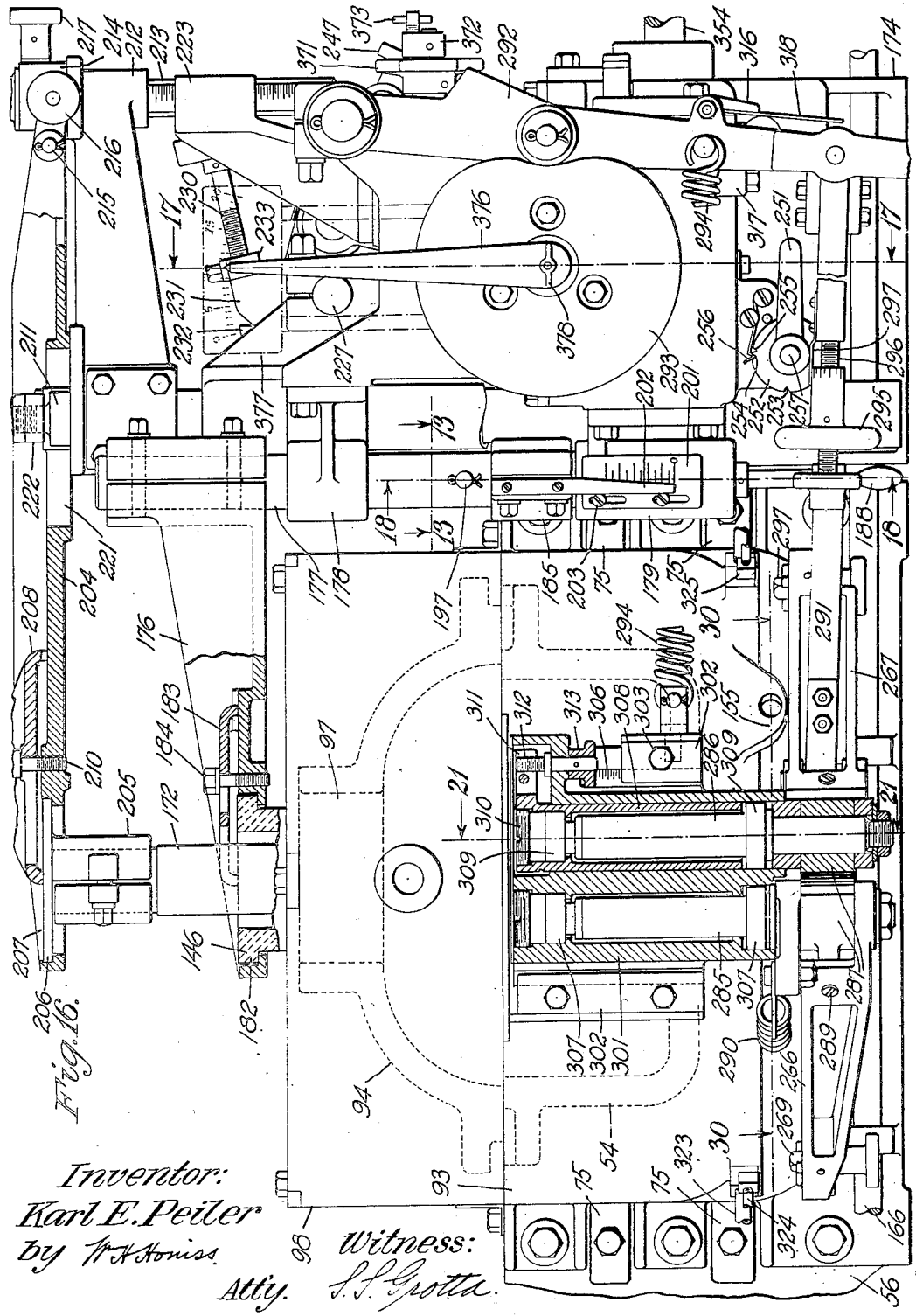

The tube 146 is carried by an arm 176 clamped to a tubular rod 177 movable vertically in bearings 178 and 179 (Fig. 16). The tube is removably secured in the arm 176 by a connection comprising a flange 182 (Fig. 16) on the upper end of the tube, seated in a recess in the arm. A forked clamp 183 holds the flange in its seat by means of a screw 184 passing through a slot in the clamp and threaded into the arm. One end of the slot may be enlarged to permit the passage of the screw head so that the clamp may be removed my loosening the screw and sliding the clamp to the right in Fig. 16, without removing the screw.

The rod 177 is held from rotary movement in the bearings 178 and 179, by an arm 185 fixed on the rod and carrying a pin 186 (Figs. 13, 14 and 15) sliding in a bracket 187 projecting from the bearing 179.

Figure 18:
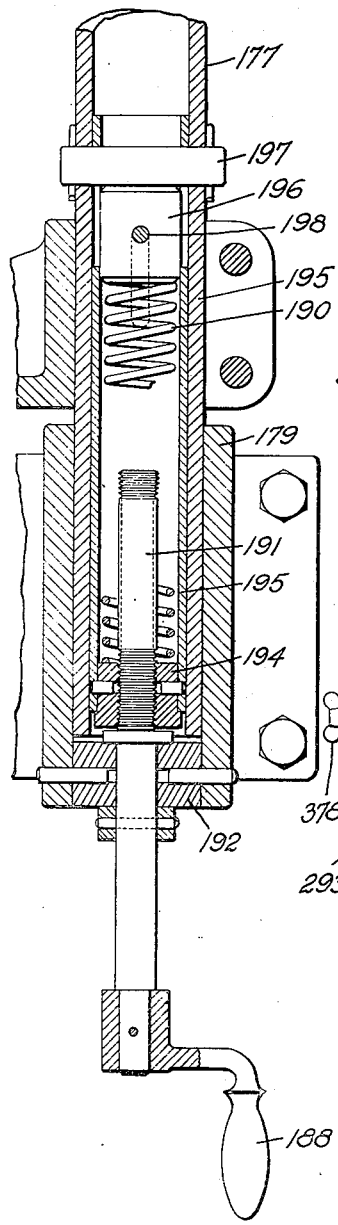
Fig. 18 is a partial side elevation in section on the line 18—18 of Fig. 16.
Figure 17:
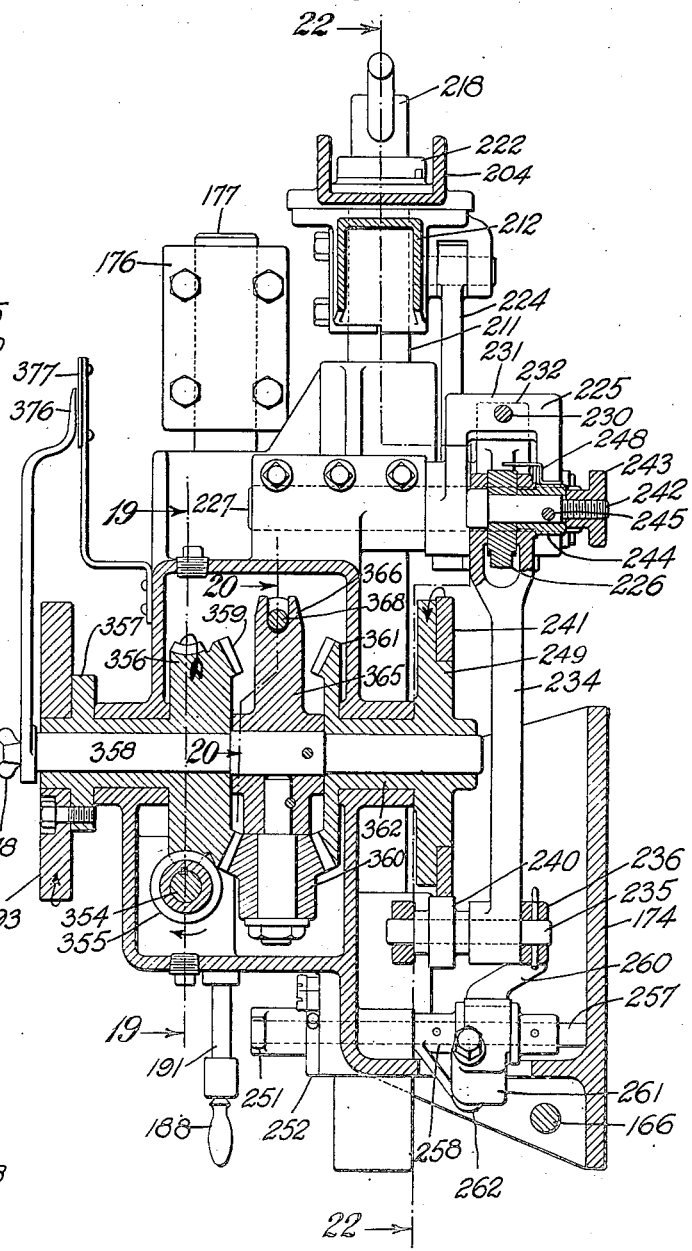
Fig. 17 is a side elevation in section on the line 17—17 of Fig. 16.

The tube 146 is adjusted vertically by screw 191 journaled in the bushing 192 of the bearing 179, and provided with a crank 188 (Figs. 17 and 18). The screw is threaded in a nut 194 fixed in the sleeve 195 slidable within the tubular rod 177. The pressure of the screw is transmitted to the rod 177 through the cushioning spring 190 disposed between the nut 194 and the plunger 196 which bears against a pin 197 fixed in the rod 177 (Fig. 18). The sleeve is slotted to permit it to slide relatively to the pin 197 and to the pin 198, the latter serving as a stop pin for the plunger 196. If the glass should be chilled enough to impede the movement of the tube 146, the spring 190 acts as a cushion in the connection between the tube and the nut 194, and raises the tube gradually without damaging it by the yielding but increasing pressure of the spring.

Inasmuch as some of the important operating implements or parts are submerged in the glass or are otherwise concealed from the sight of the operator, means are preferably provided for visibly indicating either absolutely or relatively the working positions or movements of the more important of these parts, preferably by graduated scales disposed in plain view of the operator. To thus visibly indicate the position of the lower end of the tube 146, a graduated scale 201 (Fig. 16) is attached to the bearing 179, and the pointer 202 is attached to the arm 185, which moves up and down with the tube 146. As these tubes may vary in length, the pointer or the scale, in this case the latter, is provided with slots for receiving its holding screws 203, so that the scale may be adjusted vertically. The scale graduations preferably indicate the distance between the bottom end of the tube and the upper surface of the curb 147, the scale 201 being preferably adjusted so as to indicate zero when the tube is in its downward closed position upon the curb. Thus the operator knowing the spaces required between the end of the tube and the curb to feed the different desired weights of mold charge, is enabled by observation of the scale to set the tube at once to the correct positions without making repeated trials and readjustments of the tube.

The plunger 172 is arranged to be reciprocated periodically to assist in the formation of mold charges much as shown in various of my prior applications, and it is capable of various adjustments. The plunger is carried by an arm 204 (Figs. 15, 16 and 22), and the connection between the plunger and the arm is such that the plunger may be easily removed without disturbing the adjustment of the arm. For this purpose, the upper end of the plunger is clamped in a removable chuck 205 having a circular plate 206 at its upper end which is received and supported in an opening 207 in the end of the arm 204, and held down on its seat by a clamp 208 pressed upon the plate by a hand screw 210. The clamp is slotted to receive the screw, so that when the screw is loosened, the clamp may be slid back from over the top of the plate 206, thereby permitting the plunger to be removed.

The arm 204 is guided for vertical reciprocation by a rod 211 which slides in vertically spaced guide-bearings, being adjustably clamped to a bracket 212 fixed to the upper end of the rod. This construction permits adjusting the arm 204 laterally in any direction, to centralize the plunger with the outlet ring, by sliding the arm on its bracket 212, or swinging it on the rod 211, or by a combination of these adjustments. The bracket 212 carries a post 213 projecting vertically on both sides of the bracket, the upper end being loosely embraced by a square collar 214 (Figs. 22 and 23) carrying a hinge pin 215, on which the arm 204 is mounted. The collar 214 and the parts connected therewith may be adjusted laterally with relation to the bracket 212 by means of hand screws 216 and 217 threaded into the post 213 at right angles to each other. Each screw passes through a horizontal slot in the collar in which it is held from longitudinal movement by suitable collars, so that by turning the screw 217 (Fig. 22) the collar and arm 204 may be adjusted longitudinally, and by turning the screw 216 (Fig. 23) the arm may be adjusted transversely by a swinging movement about the upper end of the rod 211. The arm 204 may be clamped in position after adjustment by a wing nut 218 threaded onto the top of the rod 211 and bearing on a clamp 222, and by a wing nut 219 on the top of the post 213. The rod 211 passes through a slot 221 (Fig. 15) in the arm 204, and when the nut 218 is loosened to permit adjustment of the position of the plunger, the arm may slide upon or pivot about the upper end of the rod 211. In order that the arm 204 may be swung upwardly on the hinge pin 215 without removing the nut 218, or the clamp 222 the nut is made of such size that it will pass through the slot 221, and the clamp 222 beneath the nut is of such proportions that when it is turned transversely of the arm, the ends of the clamp rest on the arm; but when the nut 218 is loosened, the clamp may be turned lengthwise of the arm, which permits it to be lifted without removing the nut or the clamp from the rod 211.

In order to prevent the rod 211 from turning, and thereby displacing the plunger, the lower end of the post 213 projects downwardly and is engaged in a bearing 223 (Fig. 22). The lower end of the post 213 may be provided with graduations if desired, which by their relation to the top of the bearing 223 indicate the vertical position of the plunger with respect to the outlet. The graduations are preferably arranged to indicate zero when the end of the plunger is in the plane of the final discharge outlet (Fig. 10), and to read above and below zero.

Means is provided for reciprocating the plunger, its carrying arm 204 and other associated parts, and provision is made for adjusting both the amplitude of reciprocation and the vertical positions of the end of the plunger relative to the outlet. A link 224 (Figs. 17 and 22), having its upper end pivotally connected with the bracket 212, and its lower end connected with an arm 225, is operated by a cam 241 on the shaft 358, by connections best shown in Fig. 22. The arms 225 and 226 are pivotally mounted on a stud 227, and are adjusted to different relative positions by a screw 230 threaded into a yoke 231 formed on the arm 225, and bearing against a tail 232 projecting from the arm 226. A threaded clamp 233 pinned loosely to the yoke 231 is provided to clamp the screw in adjusted position. The arm 226 is actuated by a link 234 connected by a stud 235 with a cam arm 236 mounted on a fixed pivot 237. The stud 235 carries a cam roll 240 (Fig. 17) in engagement with a cam 241 by which the parts are actuated. The cam disc 241 is removably secured to its drive shaft by means of a hub 249.

Adjustment of the screw 230 will change the relation between the arms 225 and 226, thereby raising or lowering the path of reciprocation of the plunger without changing its length of stroke. This adjustment permits the plunger at the lower end of its stroke to project into or through the outlet ring, or to remain above the ring as may be desired.

The means for adjusting the length of stroke of the plunger comprises an adjustable connection between the link 234 and the arm 226, which is slotted to receive a pin 242 (Figs. 17 and 22) carried by the forked upper end of the link 234. One end of the pin is threaded to receive a hand nut 243, bearing against a collar 244, which clamps the arm 226 between a head on the pin and the collar. The effective length of the lever formed by the arm 226 is adjusted by moving the pin 242 in the slot of the arm by means of a screw 245 threaded into the pin 242 and journaled in a pivoted block 246 (Fig. 15) mounted on the arm.

By turning a hand wheel 247 on the screw 245, the pin 242 may be slid in the slot so as to produce different lengths of plunger stroke, and in order that the sroke may be conveniently determined without experiment, a pointer 248 (Figs. 15, 17 and 22) cooperates with a scale on the top of the arm 226, which indicates the lengths of the plunger stroke produced by the various settings of the pointer 248. It is preferred that the slot in the arm 226 shall be formed on an arc struck from the stud 235 forming the lower pivot of the link 234 when the cam 241 is in such position that the plunger is at the bottom of its stroke, whereby the adjustments in the length of the plunger stroke vary the upper end of the stroke only, without changing the position of the lower end of the stroke, leaving that position to be changed only by adjustments of the screw 230.

For convenience in removing the cam 241, to permit the substitution of other cams having different shapes, it may be made in two parts removably secured to a flange, by screws or otherwise, as shown in Fig. 22.

It is desirable at times to hold the plunger inoperative in elevated position without stopping the operation of the entire apparatus. This may be done by turning a handle 251 (Fig. 16) capable of assuming three positions, one permitting the regular operation of the plunger (Fig. 22), a second in which the plunger will be held inoperative at approximately its highest operating position, and a third in which it is elevated slightly above its highest operating position, to hold the cam roll 240 clear of the plunger operating cam 241. The handle is provided with a disk 252 having a series of notches 253, 254 and 255, the disk being turned so that its notches are selectively engaged by a spring detent 256 to hold it in any of these three positions.

The handle 251 is fixed on a shaft 257 mounted in suitable bearings in the box 174 (Fig. 17) and carrying a fixed eccentric collar 258 (Figs. 22, 24 and 25) on which a hook 260 is rotatably mounted. The hook carries a counterweight 261, which tends to swing it to the right into the position of Fig. 24 where it has engaged a shoulder 259 on the plunger cam arm 236 and holds the arm and roll from following the cam. During the operation of the plunger, the hook is held in inoperative position (Fig. 22) by an arm 262 formed integral with the eccentric collar 258, which engages a spring pressed plunger 263 (Fig. 24) carried by the counterweight 261, being held in this position by the engagement of the detent 256 with the notch 255.

When the plunger is to be held inoperative in elevated position, the handle 251 is turned to put the notch 254 into engagement with the detent 256, moving the arm 262 slightly out of engagement with the plunger 263, as shown in Fig. 24. In this position the counterweight 261 acts to swing the hook over the shoulder 259 if the cam arm 236 is in approximately its lowest position, the plunger being correspondingly elevated. If the handle should be turned to this position while the plunger is down and the arm 236 is in a higher position, the hook will swing against the end of the arm, and as soon as the arm is lowered, the counterweight will swing the hook over the arm (Fig. 24), and thus prevent the plunger from moving downwardly. This, however, would leave the roll 240 in a position where it would be struck by the high part of the cam at each revolution. To avoid this the handle 251 is turned to bring the notch 253 into engagement with the detent 256. This turns the eccentric collar 258 from the position shown in Fig. 24 to that of Fig. 25, thus turning the eccentric downwardly, and thereby pulling the hook down and moving the roll 240 entirely out of the path of the cam.

When the plunger is to be put in operation again the handle 251 is turned to the position shown in Fig. 22, bringing the notch 255 under the detent 256 and moving the arm 262 against the plunger 263. This movement turns the eccentric collar 258 upwardly, so as to place the roll 240 inside the path of the high part of the cam 241, which when it engages the roll 240 depresses the arm 236 far enough to release the hook 260, allowing the spring pressed plunger 263 to move the hook to the left into the position of Fig. 22, releasing the cam arm 236 and allowing the plunger to resume operation. This construction enables the plunger to be put into or out of operation only when the high part of the cam is adjacent the roll 240, thus avoiding the shock that might occur if these shifts were made when the low part of the cam is adjacent the roll.

The mold charge produced at each operation of the plunger is severed by shear mechanism operating in timed relation to the plunger mechanism. Shear blades 173 are mounted to reciprocate below the outlet ring 149, and provision is made for adjusting the shears toward and from the outlet, and also for adjusting one shear blade with relation to the other, so as to bring the blades into proper shearing relation when they close. The blades 173 are mounted on arms 266 and 267 (Figs. 15, 16 and 30), which oscillate about parallel axes under the front of the forehearth. The left shear blade, as shown in Fig. 30, is fixed on a carrier 268, secured to the arm 266 by a bolt 269, which fixes the blade in predetermined relation to the arm.

The shear blades are of the V-shaped type, having two points of contact where the V-shaped edges cross each other at 180 (Fig. 34) and it is important that the two shear blades shall contact equally at these two points. Provision is therefore made for tilting or swivelling one of the shear blades relatively to the other to insure such equal contact. For this purpose, the right blade, as shown in Fig. 30, is secured to a stud 270 (Figs. 31, 32 and 33) by screws 271. The stud is provided with cylindrical bearing surfaces 272, as shown in Fig. 33, received in V blocks formed on a carrier 273, having a slotted shank 274 adapted to be received in the shear arm 267. The shear blade is tilted by screws 276 passing through clearance holes in the carrier 273 and threaded into ears projecting from the stud 270. By loosening one of these screws and tightening the other, the blade is tilted so as to bring its V edges into proper engaging relation to V edges of its opposite blade, and is held in that position.

The shear blade carrier 273 is clamped in its arm 267 by a screw 277 similar to the screw 269 by which the carrier 268 is secured in the opposite arm 267. A pin 278 forms a stop for the end of the shank 274 of the carrier 273.

One of the features of this invention is a device for steadying the mold charge while being severed, and especially for preventing the lower shear blade from deflecting the upper end of the severed mold charge in the direction of the severing movement of the blade. Such deflection of the upper end of the charge may cause it to be improperly delivered to the mold or chute to which it is dropped. To prevent this, a guide 279 is positioned beneath the blades and connected to move with the upper shear blade. As shown in Figs. 31 and 32, the guide 279 is carried on a threaded stud 280 fixed in the carrier 273. The guide is positioned longitudinally of the stud by nuts 281 by which it may be adjusted toward and from the cutting edge of the shear blade, into proper relation to the side of the mold charge. This construction also provides convenient means for changing the guide 279 to accommodate larger variations in the size or shape of the mold charge than can be accommodated by adjustment of the guide. The guide is prevented from turning about the stud 280 by a pin 282 (Figs. 31 and 33) fixed in the carrier 273 and having a sliding bearing in the guide.

The shear arms 266 and 267 are fixed on the lower ends of shafts 285 and 286 (Figs. 16 and 30) pivotally mounted on the front of the bowl casing 93. The shear arms are connected to move together by gear segments 287 mounted in the forked ends of the respective arms, and in order that the blades may be adjusted so as to meet in any desired portion of the glass, an adjustable connection is provided between at least one of the gear segments 287 and the arms. Preferably each gear segment is provided with a finger 288, which is rigidly connected with its arm by set screws 289 which bear on opposite sides of the finger. By adjusting these screws the relation between the two shear blades may be adjusted so that they will meet at the axis of the outlet, or in the center of the glass to be severed, or elsewhere if desired.

The shears are actuated in their severing movement by a spring 290 connected to the arm 266, and in their opening movement by a link 291 connected by a universal joint with the arm 267. The link 291 is actuated by a shear cam lever 292 (Figs. 15 and 16) pivotally mounted on the box 174. The lever is oscillated in one direction by a cam 293 and in the other by a spring 294. The relation between the shear cam lever 292 and the shear blades may be adjusted so as to cause the blades to cut earlier or later or to provide more or less overlap to the blades in their closed position, by a hand wheel 295 (Figs. 15 and 16) fixed on a right and left screw 296 threaded into and connecting two parts of the link 291. A pointer 297 may be provided to cooperate with graduations on the hub of the hand wheel to indicate the adjustment of the shears.

Means are provided for adjusting one or both of the shear blades vertically toward or from the outlet. When it is desired to change the level of the severing plane so as to cut closer to or farther from the outlet, both shear arms are adjusted together, preserving the cutting relation of the blades to each other. This vertical adjustment is provided for by mounting the shear carrying shafts 285 and 286 in a slide 301 (Figs. 15, 16 and 21) carried in vertical ways formed on the front of the bowl casing 93, in which it is secured by gibs 302. To adjust the slide vertically, the gib screw 303 is loosened and a screw 304 (Fig. 21) is turned. This screw is journaled in a lug 305 formed on the slide 301, and threaded into a boss on the bowl casing 93. By turning the screw, the slide and the entire shear mechanism carried thereby may be raised or lowered.

One effect of thus changing the plane of severance is to modify the shape of the end of the mold charge. For this and other reasons, means are provided for indicating the level of the severing plane. A scale 306 (Fig. 16) is arranged to move with the slide 301 and to be read with reference to the top of the right gib 302. The scale is preferably graduated to indicate the distance from the bottom of the outlet ring 149 (Fig. 10) to the plane of severance, as indicated by the distance X in said figure. Thus the operator is enabled to set the shear blades at the desired level.

The shaft 285 which carries the shear arm 266 is provided with suitable anti-friction bearings 307 (Fig. 16) mounted directly in the slide 301. To permit adjustment of one of the shear blades so as to bring it in proper shearing relation to the other blade, the shaft 286 which carries the shear arm 267 is not mounted directly in the slide 301, but is carried by a sleeve 308 (Figs. 16 and 21). The shaft 286 is provided with ball bearings 309 which permit it to rock in the sleeve 308, but it is prevented from longitudinal movement by a cap 310 threaded into the sleeve 308, and engaging the top of the upper bearing 309. The sleeve 308 carries a projecting lug 311 (Fig. 16), which is threaded to receive a screw 312 mounted in the side 301. The screw is provided with a hand wheel 313, by which it may be turned to move the sleeve 308 vertically in the slide 301, thereby adjusting the upper shear blade carried by the arm 267 toward or from the lower blade.

At certain times it is desirable to hold the shear blades in retracted position so as to permit the glass to be discharged without severing mold charges. The shears may be held in inoperative position by a latch 316 (Figs. 16, 26 and 27) pivotally mounted on the shear cam lever 292. During the operation of the shears this latch slides on the top of a plate 317. When it is desired to hold the shears out of operation, the operator moves the shear cam lever 292 slightly further to the right than it is moved by the cam 293, which permits the latch 316 to drop into a notch in the plate 317, as shown in Fig. 26. When the shears are to be thrown into operation again, the lever 292 is swung to the right enough to enable the latch 316 to be lifted from the notch in the plate 317 by means of a depending handle 318, which allows the lever 292 to move into engagement with the cam 293.

Means are provided for cooling the shear blades, and for applying a liquid, preferably oil, thereto. When the shears are open they occupy a position beneath the bowl casing 93, substantially as indicated in Figs. 10 and 15. Each side of the bottom of the bowl casing is provided with an air chamber 319 approximately over each of the blades when they are in open position. The bottom of the chamber is closed by a plate 321 (Figs. 10, 11 and 12), having a series of holes 322 through which air is discharged onto the cutting edge of the blade. The holes are arranged in a V-shape corresponding approximately to the cutting edge of the blade, and the holes are slanted away from the glass outlet on each side, so that the cooling aid will be directed away from the discharging glass and toward the outside of the machine, as indicated by the arrow in Fig. 10. Each chamber 319 is connected by a pipe 323 with a source of air pressure, so that all the time the shears are in retracted position they are subjected to a cooling blast of air.

The means for spraying a liquid on the shear blades comprises a pipe 324 supplying the liquid, preferably oil, to a tube 325 attached to each plate 321. The inner end of this tube discharges through a nozzle 326 having a tapered end projecting through a correspondingly tapered opening in the plate 321 (Fig. 12). The nozzle 326 is received in a vertical opening in the end of the tube 325, so that it may be moved toward and from the plate, and it is so adjusted that an annular opening is formed between the nozzle and the plate 321. Air pressure in the chamber 319 causes the oil discharging from the nozzle to take the form of a spray, and directs it onto the shear blades. Suitable regulating mechanism (not shown) may be provided to control the supply of oil to the nozzle and, as the required amount of oil is very small, it is preferred that the oil shall be delivered from the nozzle one drop at a time so as to produce a periodic oil spray.

The shear blades when in working position are not conveniently accessible for adjustment into cutting parallelism with each other, being in the heated environment beneath and close to the forehearth structure. It is therefore, desirable to adjust the blades into proper parallelism for their cutting action before placing them in working position. For this purpose, a blade setting adjunct (Figs. 34, 35, 36) to the machine is provided, which may, if desired, be attached to any convenient portion of the frame work. This blade setting device consists of a block 328 provided with slots 329 and 337 having seats, 335 and 336, for receiving the shanks of the blade carriers 273 and 268. These seats are parallel with each other, thus holding the shanks of the blade carriers in the same parallel relation to each other that they will occupy in working position on the shear arms 266 and 267. For convenience of construction and use, the seats 335 and 336 face upwardly whereas the corresponding seats on the shear arms 266 and 267 face downwardly. Hence the shear blades and carriers when seated on the blade setting device (Figs. 34, 35 and 36) are inverted and also reversed as to the left and right positons they occupy on the shear arms (Figs. 30 and 31), the left hand carrier 268 of Fig. 30 being the right hand carrier of Fig. 34, and vice versa. The setting block 328 is provided with slots 329 and 337, for receiving the shanks 274 and 275 respectively of the carriers 273 and 268, and pins 330 and 340 form stops for the ends of the shanks.

The shank 274 is clamped to its seat 335 by a hand nut 331 threaded on to a stud 332 fixed in the block 328. A spring 333 surrounds the stud so as to lift a washer 334 when the hand nut is loosened so as to facilitate the entrance and removal of the shank.

The other end of the block is provided with a vertically movable slide 338 for receiving the shank 275 of the fixed shear blade carrier 268 which, when assembled in the machine, is the left blade (Fig. 30). The shank 275 is received in a slot 337 in the slide 338, in which it is positioned and secured in the same manner as the other shank 274, that is, by a hand screw 339. The slide 338 is clamped by a bolt 343 and hand nut 341. The slide is adjusted vertically by a screw 342 mounted in the slide and threaded into the block (Fig. 36).

In the use of this device, the adjustable blade carrier 273 is secured in the slot 329, and the screws 276 are loosened so as to permit the stud 270 to tilt on the cylindrical portions 272. The fixed shear blade is then secured by its carrier 268 in the slide 338, which is then adjusted downwardly by the screw 342, bringing the blades together and swinging the adjustable blade into parallelism with the fixed blade, after which the screws 276 are tightened to hold the adjustable blade in that position. Both carriers are then removed from the positioning device and inserted in their respective arms 266 and 267 where the blades will be in exact parallelism and capable of being adjusted to make a clean cut by turning the hand wheel 313 (Fig. 16) to adjust the shear arm 267 vertically and thus bring the blade 173 into proper shearing contact.

The mold charges produced by this and other glass feeding machines are delivered to the molds of shaping machines, which are connected so that the two machines will be driven in synchronism. In some instances, the machines are connected by gearing or other mechanical devices, adjustable so as to deliver the mold charges to the molds at the proper times. In other instances the shaping machines especially, when operated intermittently, are periodically started into operation by pneumatic means, and for use with such shaping machines, the present machine is provided with means consisting of a trip valve 344, for controlling the time of admitting pneumatic pressure to the shaping machine, to put it in operation periodically in proper time relation to the delivery of the mold charges thereto. The valve 344 may be of any well known construction, but it is illustrated herein as comprising a plunger 345 having a port or passage 345$^a$ which is moved into position to connect a pipe 346 leading to a supply of compressed air, with a pipe 347 connected with suitable starting mechanism of the shaping machine, whereby elevation of the plunger will admit air pressure to the starting mechanism to put the shaping machine into operation.

The plunger 345 is lifted by a link 353 connected with a cam lever 348 carrying a cam roll 349 in operative relation to a cam 350, which makes one rotation for each mold charge delivered by the feeder. This cam may be connected with the shear actuating cam 293 (omitted from Fig. 28). In order that the time at which the shaping machine is put into operation may be adjusted with relation to the time of severing and delivering of the mold charge, the cam 350 is split and provided with a clamping screw 351. By loosening this screw, the cam may be turned with relation to the shear cam so as to vary the time of admitting air pressure to the starting mechanism of the shaping machine.

Improved mechanism is provided for adjusting the relative time of operation of two mechanisms driven from the same source of power during the operation of the machine. In the illustrated embodiment of the invention, this adjustment varies the time of occurrence of the plunger movements relative to the time of the severing operations.

Figure 28:
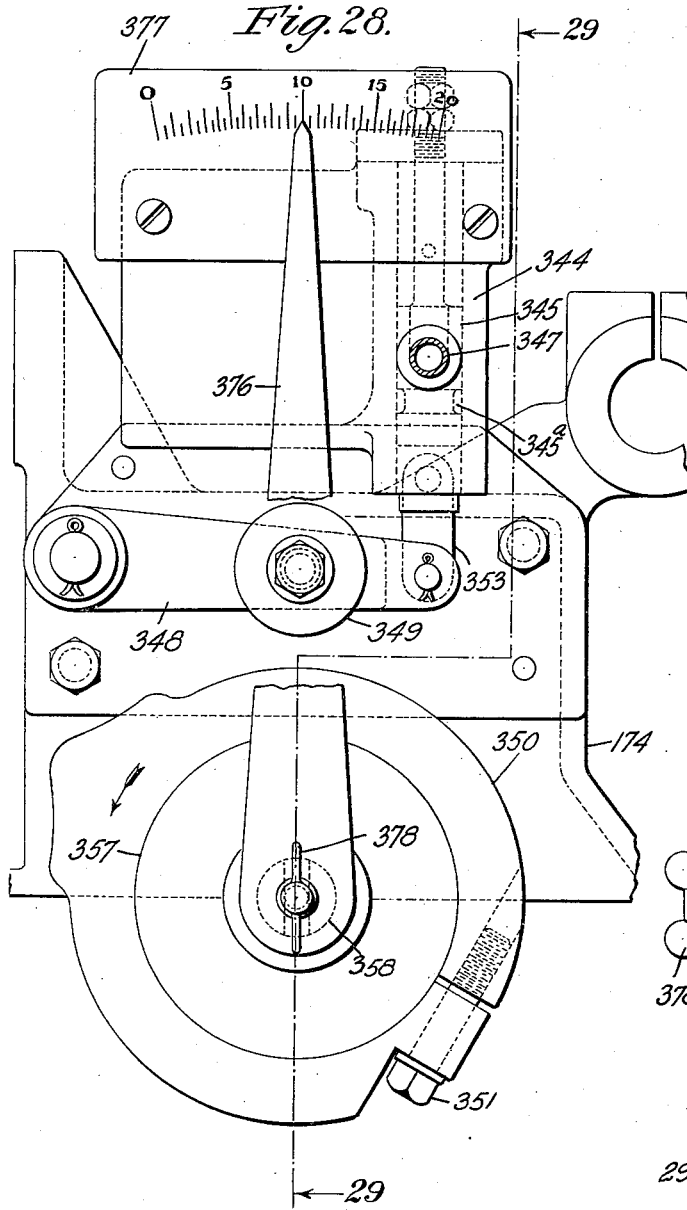
Fig. 28 is a partial front elevation showing a device for synchronizing a shaping machine with the feeder.
Figure 29:
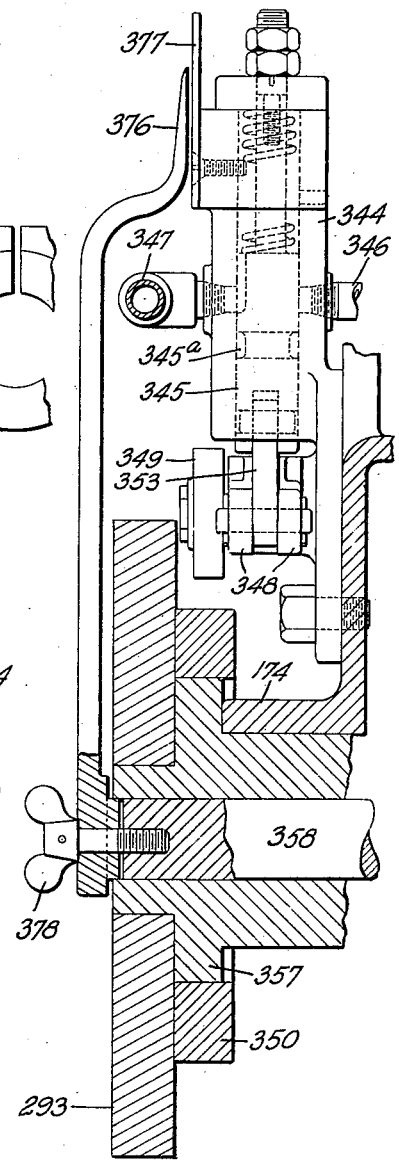
Fig. 29 is a side elevation in section on the line 29—29 of Fig. 28.

The charge forming mechanism is driven by a shaft 354 (Figs. 15 and 16) which may be directly connected by suitable gearing with the drive of the associated shaping machine when the latter is mechanically driven. This shaft is mounted in the mechanism box 174 and carries on the inside of the box a worm 355 (Figs. 17 and 19) in engagement with a gear 356. The gear is provided with a sleeve journaled in a bearing in the box 174 and carrying a flange 357 to which the shear cam 293 is attached, and which may also carry the cam 350 for controlling the operation of the associated shaping machine when that machine is pneumatically controlled, as shown in Figs. 28 and 29.

One side of the worm gear 356 carries a bevel gear 359 in engagement with an idle pinion 360, which is in mesh with a bevel gear 361 having a sleeve 362 journaled in a bearing in the box 174 and carrying a flange 249 on which the plunger actuating cam 241 is fixed. The idle pinion 360 is mounted on a hub 365 fixed on the shaft 358, journaled in the gears 359 and 361.

The worm gear 356 and bevel gear 359 rotate in the direction of the arrow (Fig. 17), and through the idler pinion 360, rotating the bevel gear 361 and the cam 241 in the reverse direction. In order to change the angular relation between the two bevel gears 359 and 361, and thereby adjust the relative time of occurrence of the shearing operation by the cam 293, and the movements of the plunger actuated by the cam 241, means are provided for swinging the idle pinion 360 about the axis of the shaft 358. The hub 365 is provided with an arm 366 (Figs. 17, 19 and 20), the forked upper end of which is engaged between a collar 367 fixed on a rod 368, and the end of a tubular screw 369. By adjusting the screw longitudinally, the arm 366 is swung about the axis of the shaft 358 and the idle pinion 360 is moved to change the relative position of the two bevel gears driven thereby. The screw 369 is threaded through a cap 370 fixed on the box 174, and is provided with a hand wheel 371. To clamp the arm 366 in its adjusted position between the collar 367 and the end of the screw 369, the rod 368 carries a fixed collar 372 threaded to receive a set screw 373, which may be tightened to clamp the end of the arm 366 firmly between the two engaging surfaces, thereby insuring stability and exactly timed movement of the plunger and other parts. The cap 370 is split and provided with a clamp screw 374 to lock the tubular screw 369 in position.

In order that the relation between the time of operation of the shears and the plunger may be predetermined and set so as to obtain results in accordance with previous experience, the machine is provided with an indicator by which the time relation of the two parts is visibly indicated. The end of the shaft 358 (Figs. 17, 28 and 29) carries a pointer 376 cooperating with a scale 377 fixed on the machine and graduated with suitable index characters to enable previously determined settings of the timed relation to be reproduced. When the arm 366 is adjusted by the hand wheel 371, the pointer 376, being fixed on the shaft 358 is correspondingly moved over the scale. In order that the pointer may be conveniently removed, to facilitate the removal of the cams 293 or 350, it is connected with the end of the shaft 358 by a key, and clamped by a wing screw 378.

The operation of the feeder will be apparent from the description of its parts. The means for forming, suspending and separating the glass into mold charges is capable of all necessary adjustments without interrupting the continuous operation of the machine.

Certain features illustrated and described in connection with the present invention, form a part of the subject matter of my copending applications Serial Nos. 294,792, filed May 5, 1919, and 541,639, filed March 7, 1922.

Inventions disclosed but not claimed herein are also disclosed and claimed in Patents, Nos. 1,655,391 of January 3, 1928, and 1,629,409 of May 17, 1927, granted on my respective applications, Serial Nos. 294,792 and 541,639, aforesaid, and in continuations or division of said aforesaid applications or of the present application. The improved glass-severing shears and their operating and adjusting mechanisms and certain other novel features closely related thereto are claimed in my co-pending divisional application, Serial No. 69,803, filed November 18, 1925. The improved forehearth construction and features relating to the control of the temperature and viscosity of the glass while such glass is being conducted to the point of delivery or feed outlet are claimed in my copending application, Serial No. 236,025, filed November 30, 1927, as a continuation in part of the present application.

A complete apparatus has been described for taking glass from the melting tank and delivering it in the form of separated mold charges, but many of the features described in this joint use may be effectively employed in other combinations. The illustrated embodiment of the invention has been selected for the purpose of illustration only, and the details of construction and arrangement illustrated and described may be modified in various ways within the scope of the appended claims.

I claim:—

1. Apparatus for feeding molten glass, comprising a forehearth projecting from a tank and having a discharge outlet, a chute to receive glass from the outlet and direct it to a waste receptacle, means for supporting the chute for swinging movement longitudinally of the forehearth towards the front thereof into glass receiving position and towards the rear thereof out of glass receiving position, and a latch for retaining the chute in either of its said positions.

2. Apparatus for feeding molten glass, comprising a forehearth projecting from a tank and having a discharge outlet, a chute supported from the forehearth to swing longitudinally thereof, to and from position below the outlet, a flexible connection for supplying fluid to the chute, a laterally extending handle for swinging the chute, and a latch to hold the chute in or out of position below the outlet.

3. Apparatus for feeding molten glass, comprising a forehearth having a submerged discharge outlet, an orifice ring forming a continuation of the outlet, a carrier for the ring pivotally mounted on the forehearth, a removable lever, and a fulcrum for the lever, carried by the forehearth, said carrier having a portion adapted to be engaged by the lever whereby the carrier and ring may be moved by the lever to and from their position below the outlet.

4. Apparatus for feeding molten glass, comprising a forehearth having a submerged discharge outlet, an orifice ring forming a continuation of the outlet, a ring carrier hinged to the forehearth, a removable lever, a fulcrum therefor fixed to the forehearth, and a latch mounted on the forehearth in position to be turned under the ring carrier where it is positioned under the outlet by the lever.

5. The combination with a container for molten glass having a discharge outlet, of a heat retaining closure therefor, and a bayonet joint connection for connecting the closure to the container, whereby the closure may be attached and detached quickly.

6. The combination with a container for molten glass having a discharge outlet, an orifice ring forming a part of the discharge outlet, a carrier for the ring, a closure for the orifice ring, and co-engaging means on the carrier and closure for supporting the closure in operative position.

7. The combination with a container for molten glass having a discharge outlet, an orifice ring forming a part of the discharge outlet, a carrier hinged on the container and having an opening to position the ring, lugs projecting radially of the opening, and a closure for the ring provided with ears to support it from the lugs in closing relation to the orifice.

8. Apparatus for feeding molten glass, comprising a forehearth having an outlet, a feeding implement, an arm supporting the implement in substantially vertical alignment with the outlet, and means for adjusting the arm rectilinearly, the arm being mounted on a pivot for movement out of and into operating position.

9. Apparatus for feeding molten glass, comprising a forehearth having an outlet, a feeding implement, an arm carrying the implement in substantially vertical alignment with the outlet, and means to adjust the arm horizontally both rectilinearly and angularly, the arm being mounted on a pivot about which the arm may be swung out of and into operative position.

10. Apparatus for feeding molten glass from a forehearth having a discharge outlet, comprising an implement cooperating with the outlet to regulate the discharge of glass therethrough, an arm carrying the implement, a collar to which the arm is hinged, and means for adjusting the position of the collar to adjust the arm horizontally.

11. Apparatus for feeding molten glass from a forehearth having a discharge outlet, comprising an implement cooperating with the outlet to regulate the discharge of glass therethrough, a vertical rod, an arm carrying the implement and having a longitudinally sliding and pivotal connection with the rod, and adjusting means for sliding the arm on and pivoting it about the rod.

12. Apparatus for feeding molten glass from a forehearth having a discharge outlet, comprising an implement cooperating with the outlet to regulate the discharge therefrom, an arm carrying the implement, a vertically reciprocating bracket, a collar carried by the bracket, means for adjusting the collar laterally, a hinge connecting the collar and the arm, and a sliding and pivotal connection between the arm and the bracket.

13. Apparatus for feeding molten glass, comprising an implement movable to regulate the feed of the glass, means for moving the implement periodically, and means mounted independently of said implement moving means and operable at will without manipulation of said implement moving means to hold part of said implement moving means inactive in different positions at different times, whereby the implement may be held inactive in a plurality of positions.

14. Apparatus for feeding molten glass, comprising an implement movable to regulate the feed of the glass, a cam, connections between the cam and the implement, and means operable at will without direct manual actuation of said connections to move said connections out of and again into operative relation with the cam.

15. Apparatus for feeding molten glass, comprising an implement movable to regulate the feed of the glass, a cam, operating connections between the cam and the implement, and means supported independently of said operating connections movable into operative position for automatically disconnecting the operating connection between the cam and the implement.

16. Apparatus for feeding molten glass, comprising an implement movable to regulate the feed of the glass, a cam, an operating connection between the cam and the implement, and means movable into and out of operative positions for automatically disconnecting and re-connecting the said operating connection at predetermined rotative positions of the cam.

17. Apparatus for feeding molten glass, comprising an implement movable to regulate the feed of the glass, a cam and cam arm for actuating the implement, a latch, means for moving the latch into position to restrain the cam arm from following the cam, and means for moving the latch to draw the arm away from the cam.

18. Apparatus for feeding molten glass, comprising an implement movable to regulate the feed of the glass, a cam and cam arm for actuating the implement, a latch, means for moving the latch into position to automatically engage the cam arm when the latter engages the high part of the cam, and means for moving the latch to draw the arm away from the cam.

19. Apparatus for feeding molten glass, comprising an implement movable to regulate the feed of the glass, a cam and cam arm for actuating the implement, a latch to hold the arm away from the cam, means for moving the latch to permit the arm to move toward the cam, and means for yieldingly moving the latch out of engagement with the arm when the latter engages the cam and releases the latch.

20. Apparatus for feeding molten glass, comprising an implement movable to regulate the feed of the glass, a cam and cam arm for actuating the implement, a latch, means for moving the latch yieldingly into and out of operative relation with the arm, means for actuating the latch to move the arm toward and away from the cam, and means for holding the latch out of engaging relation to the arm.

21. Apparatus for feeding molten glass, comprising an implement movable to regulate the feed of the glass, a cam and connections to actuate the implement, and means movable into and out of operative positions to automatically disconnect and reconnect the implement and the cam.

22. A glass feeding machine comprising a feed regulating implement, a lever for reciprocating the implement, a cam arm connected with the lever, and means for adjusting the said connection toward the lever fulcrum to increase the reciprocating stroke of the implement and away from the lever fulcrum to decrease the said stroke by varying only one of the limits of the stroke.

23. A glass feeding machine comprising a feed regulating implement, a lever for reciprocating the implement, a cam, a cam roll, a link connecting the roll and the lever, and means for adjusting the connection between the link and the lever to change the amplitude of the reciprocating stroke of the implement.

24. A glass feeding machine comprising a vertically movable implement, a lever connected with the implement, an oscillatory pivoted arm, a link having one end pivotally connected with the oscillatory arm, and means for connecting the link with the lever at different positions along the length of the lever which are substantially concentric with the said pivotal connection of the link with the oscillatory arm when the implement is in its lowest position, whereby the amplitude of the movements of the implement may be changed without changing its lowest position.

25. A glass feeding machine comprising a molten glass container having a discharge outlet, a feed regulating implement movable toward and from the outlet, a guide rod slidably mounted at one side of the implement and supporting the latter by an overhanging arm, and an adjusting screw having a spring connection with the guide rod for moving the implement.

26. A glass feeding machine comprising a molten glass container having a discharge outlet, a feed regulating implement movable toward and from the outlet, a guide rod slidably mounted at one side of the implement and supporting the implement by an overhanging arm, and an adjusting screw extending into the guide rod and having a spring connection therewith, for moving the implement.

27. The combination with apparatus for feeding molten glass comprising implements for regulating the discharge of glass, and for severing the discharged glass, of gears for operating the respective implements, a pinion in mesh with said gears, means for applying power to one of the gears, means for adjusting the pinion about the axis of the gears to change their angular relation, means for fixing the pinion in adjusted position, and an indicator connected with the pinion to visibly indicate on a scale the said angular relation and the changes therein.

28. Apparatus for feeding molten glass from a forehearth having a discharge outlet, comprising an implement cooperating with the outlet to regulate the discharge of glass therethrough, an arm carrying the implement, a collar to which the arm is hinged, and means for adjusting the position of the collar horizontally in a plurality of directions.

29. Apparatus for feeding molten glass, comprising an implement movable to regulate the feed of the glass, means for moving said implement, and other means supported independently of said implement moving means and adjustable to and from position to automatically coact with said implement moving means to stop the movement of the implement at a predetermined place in its stroke and to maintain the implement in that position.

30. Apparatus for feeding molten glass, comprising an implement reciprocable toward and away from the outlet of a glass container to regulate the discharge of glass through said outlet, means for operating the implement periodically, and other means mounted independently of said implement operating means adjustable to and from position to automatically cooperate with the implement operating means when the implement is at the end of its retractive stroke to prevent return movement of the implement.

31. Apparatus for feeding molten glass, comprising an implement reciprocable toward and away from the outlet of a glass container to regulate the discharge of glass through said outlet, means for operating the implement periodically, and pivoted means adjustable to and from position to automatically cooperate with the implement operating means when the implement is at the end of its retractive stroke to prevent return movement of the implement and further adjustable to move said implement beyond the limit of its normal retractive stroke.

32. In glass working apparatus, an implement movable to act on glass periodically, operating means for the implement including a cam and a cam arm, a latch, a pivotal support for the latch operable to shift the latch toward and away from the cam, means tending to swing said latch on said pivot toward said cam arm, whereby said latch will automatically engage said cam arm on rotation of the cam after said latch has been shifted by its pivotal support nearly to the limit of its adjustment toward the cam, said pivotal support then being operable to shift the latch and the cam arm clear of the cam.

33. In glass working apparatus, an implement movable to act on glass periodically, operating means for the implement including a cam and cam arm, a latch, a pivotal support for the latch operable to shift the latch toward and away from the cam, means tending to swing said latch on said pivot toward said cam arm, whereby said latch will automatically engage said cam arm on rotation of the cam after said latch has been shifted by its pivotal support nearly to the limit of its adjustment toward the cam, and means for automatically swinging said latch out of the path of movement of the cam arm on rotation of said cam after said pivotal support has been operated to shift the latch as far as possible toward the cam.

34. In a glass feeding machine having a molten glass container provided with a discharge outlet, a feed regulating implement movable toward and from the outlet, a guide rod slidably mounted at one side of the implement and supporting the implement by an overhanging arm, a slidable member for transmitting motion to the guide rod, an adjusting screw, and a spring between said adjusting screw and said slidable member.

35. In a glass feeding machine having a molten glass container provided with a discharge outlet, a feed regulating implement movable toward and from the outlet, a guide rod slidably mounted at one side of the implement and supporting the implement by an overhanging arm, a tubular member slidably connected with said guide rod, the extent of relative sliding movement of the tube and the guide rod being limited, a screw for sliding said tubular member, and resilient motion transmitting means between said tubular slide member and said guide rod.

36. Apparatus for feeding molten glass, comprising a forehearth having an outlet in its bottom, a feeding implement, an arm carrying the implement in substantially vertical alignment with the outlet, a guide rod at one side of the implement, a bracket carried by the guide rod and supporting the carrying arm for vertically swinging movement about an axis located at the side of the guide rod opposite to said implement, and means adjustable on the guide rod to permit said vertically swinging movement of the carrying arm or to clamp the carrying arm to the bracket as desired.

37. Apparatus for feeding molten glass, comprising an implement movable to regulate the feed of the glass, means for moving the implement periodically, and mechanical means supported independently of said implement moving means for retracting the implement to disconnect it from its moving means.

38. In glass working apparatus, a movable member for acting on glass periodically, a cam and a cam arm for actuating the implement, a latch, means for moving the latch into position to restrain the cam arm from following the cam, and means for moving the latch to draw the arm away from the cam.

39. In glass working apparatus, an implement movable to act on glass periodically, a cam and a cam arm for actuating the implement, and means supported independently of said cam arm movable to and from position to automatically cooperate with said cam arm when the implement is retracted to prevent said cam arm from following said cam, whereby said implement will be maintained in retracted position.

40. A glass feeding machine comprising a feed regulating implement, a lever for reciprocating the implement, a cam arm connected with the lever, and means for adjusting the said connection longitudinally of the lever to vary the amplitude of the reciprocating stroke of the implement by varying only one of the limits of said stroke.

41. A glass feeding machine comprising a feed regulating implement, a lever for reciprocating the implement, a cam actuated arm for oscillating said lever to effect reciprocation of said implement, and means for adjusting longitudinally of said lever the point of application of power from said arm to said lever to vary the amplitude of the reciprocating stroke of the implement by varying only one of the limits of said stroke.

42. A glass feeding machine comprising a feed regulating implement, a lever for reciprocating the implement, pivoted means adapted when oscillated to oscillate said lever so as to reciprocate said implement, means having cycles of movement for imparting oscillations to said lever oscillating means, and means for adjusting longitudinally of said lever the place of transmission of power thereto from said lever oscillating means to vary the amplitude of the reciprocating stroke of the implement.

43. In glass feeding apparatus, a container for molten glass having a submerged outlet, an implement reciprocable in the glass toward and from the outlet for regulating discharge of glass through the outlet to aid in suspending the discharged glass in successive masses below the outlet and in regulably shaping said suspended masses, a bar-like member connected with said implement for imparting reciprocating movements thereto, a substantially vertical rod-like member disposed out of line with the axis of the outlet, said bar-like member being mounted on the rod-like member for angular adjustment about the axis of the latter, and a mounting for said rod-like member and said bar-like member, including means for adjusting the latter angularly about the axis of said rod-like member.

44. In glass feeding apparatus, a container for molten glass having a submerged outlet, an implement reciprocable in the glass toward and from the outlet for regulating discharge of glass through the outlet to aid in suspending the discharged glass in successive masses below the outlet and in regulably shaping said suspended masses, a bar-like member connected with said implement for imparting reciprocating movements thereto, a substantially vertical rod-like member disposed out of line with the axis of the outlet, said bar-like member being mounted on the rod-like member for angular adjustment about the axis of the latter, and a mounting for said rod-like member and said bar-like member, including means for adjusting the latter angularly about the axis of said rod-like member, and other means for adjusting said bar-like member rectilinearly relatively to the axial line of said outlet.

Signed at Hartford, Connecticut, this 29th day of December, 1923.

KARL E. PEILER.